US012793180B2

(12) United States Patent
Ivakhnenko et al.

(10) Patent No.: US 12,793,180 B2
(45) Date of Patent: Nov. 10, 2026

(54) SYSTEM AND A METHOD FOR OBTAINING A PROCESSED OUTPUT IMAGE HAVING QUALITY INDEX SELECTABLE BY AN USER

(71) Applicant: SAMSUNG ELECTRONICS CO., LTD., Suwon-si (KR)

(72) Inventors: Aleksei Aleksandrovich Ivakhnenko, Moscow (RU); Polina Vladimirovna Karpikova, Moscow (RU); Anastasiia Sergeevna Iashchenko, Moscow (RU); Andrei Nikolaevich Spiridonov, Moscow (RU); Ekaterina Yurievna Radionova, Moscow (RU); Riccardo Fabbricatore, Moscow (RU); Leonid Igorevich Kostiushko, Moscow (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 343 days.

(21) Appl. No.: 18/435,776

(22) Filed: Feb. 7, 2024

(65) Prior Publication Data

US 2024/0177273 A1 May 30, 2024

Related U.S. Application Data

(63) Continuation of application No. PCT/IB2023/061253, filed on Nov. 8, 2023.

(30) Foreign Application Priority Data

Nov. 9, 2022 (RU) ................................ 2022129040
Jun. 13, 2023 (RU) ................................ 2023115413

(51) Int. Cl.
*G06T 5/60* (2024.01)

(52) U.S. Cl.
CPC ...... *G06T 5/60* (2024.01); *G06T 2207/20084* (2013.01)

(58) Field of Classification Search
CPC .... G06N 3/045; G06N 3/0464; G06N 3/0475; G06N 3/082; G06N 3/094; G06T 5/60; G06T 2207/20084
See application file for complete search history.

(56) References Cited

U.S. PATENT DOCUMENTS

| | | | |
|---|---|---|---|
| 9,569,821 | B2 | 2/2017 | Takahashi et al. |
| 11,348,005 | B2 | 5/2022 | Navarrete Michelini et al. |

(Continued)

FOREIGN PATENT DOCUMENTS

| | | |
|---|---|---|
| CN | 111415311 A | 7/2020 |
| CN | 112906721 A | 6/2021 |

(Continued)

OTHER PUBLICATIONS

Park, Junyong, Jong-Ryul Lee, and Yong-Hyuk Moon. "Improved early exiting activation to accelerate edge inference." 2021 International Conference on Information and Communication Technology Convergence (ICTC). IEEE, 2021. (Year: 2021).*

(Continued)

*Primary Examiner* — Randall K. Baldwin
(74) *Attorney, Agent, or Firm* — Sughrue Mion, PLLC

(57) ABSTRACT

A system for obtaining output images having a quality index selectable by a user includes an electronic device including at least one processor and a memory storing input images and a set of generative artificial neural networks (GANs), the at least one processor being configured to perform artificial neural network operations. Each GAN is selectable by the user from the set of GANs stored in the memory, for obtaining an image with predefined quality index, each GAN is pre-trained and includes a plurality of Earlier Exit (Continued)

branches each of which is connected after each calculating module, each Earlier Exit branch contains as many calculating modules as remain in the backbone from a connection point of that Earlier Exit branch to a backbone exit, and each calculating module of each Earlier Exit branch performs a same function as a corresponding remaining calculating module in the backbone.

20 Claims, 16 Drawing Sheets

(56) References Cited

U.S. PATENT DOCUMENTS

| | | | | |
|---|---|---|---|---|
| 2020/0057824 | A1 | 2/2020 | Yeh et al. | |
| 2021/0089903 | A1 | 3/2021 | Murray | |
| 2021/0097434 | A1 | 4/2021 | Nagai et al. | |
| 2022/0028139 | A1 | 1/2022 | Mitra et al. | |
| 2022/0130520 | A1 | 4/2022 | Xia et al. | |
| 2022/0180491 | A1 | 6/2022 | Shinohara et al. | |
| 2022/0309285 | A1 | 9/2022 | Shelhamer et al. | |
| 2023/0128637 | A1* | 4/2023 | Kouris | G06T 7/12 382/173 |

FOREIGN PATENT DOCUMENTS

| | | | |
|---|---|---|---|
| RU | 2 726 160 | C1 | 7/2020 |
| RU | 2 770 132 | C1 | 4/2022 |
| WO | 2022/098203 | A1 | 5/2022 |

OTHER PUBLICATIONS

Bakhtiarnia, Arian, Qi Zhang, and Alexandros losifidis. “Single-layer vision transformers for more accurate early exits with less overhead.” Neural Networks 153 (2022): 461-473. (Year: 2022).*

Sarti, Simone, Eugenio Lomurno, and Matteo Matteucci. “Anticipate, Ensemble and Prune: Improving Convolutional Neural Networks via Aggregated Early Exits.” arXiv preprint arXiv:2301.12168 (Jan. 2023). (Year: 2023).*

Jie, Zequn, et al. “Anytime recognition with routing convolutional networks.” IEEE transactions on pattern analysis and machine intelligence 43.6 (2019): 1875-1886. (Year: 2019).*

Dong, Rongkang, Yuyi Mao, and Jun Zhang. “Resource-constrained edge ai with early exit prediction.” Journal of Communications and Information Networks 7.2 (2022): 122-134. (Year: 2022).*

Communication dated Feb. 16, 2024, issued by the Russian Patent Office in Russian Application No. 2023115413.

Karras et al., “Analyzing and Improving the Image Quality of StyleGAN,” arXiv:1912.04958v2 [cs.CV], Mar. 2020, total 21 pages.

International Search Report (PCT/ISA/210) dated Feb. 14, 2024, issued by the International Searching Authority in International Application No. PCT/IB2023/061253.

Written Opinion (PCT/ISA/237) dated Feb. 14, 2024, issued by the International Searching Authority in International Application No. PCT/IB2023/061253.

Laskaridis et al., “Adaptive Inference through Early-Exit Networks: Design, Challenges and Directions,” arXiv:2106.05022v1 [cs.LG], Jun. 2021, total 6 pages.

Teerapittayanon et al., “BranchyNet: Fast Inference via Early Exiting from Deep Neural Networks,” 2016 23rd International Conference on Pattern Recognition (ICPR), Dec. 2016, total 6 pages.

Jégou, Hervé et al., “Faiss”, 4 pages, https://github.com/facebookresearch/faiss, [retrieved on Nov. 10, 2022].

Drobyshev, Nikita et al., “MegaPortraits: One-shot Megapixel Neural Head Avatars”, Proceedings of the 30th ACM International Conference on Multimedia, Oct. 10, 2022, 18 pages, arXiv:2207.07621v2 [cs.CV].

Sushko, Vadim et al., “You Only Need Adversarial Supervision for Semantic Image Synthesis”, International Journal of Computer Vision 130, Mar. 19, 2021, arXiv:2012.04781v3 [cs.CV], 32 pages.

Eldar, Yuval et al., “The farthest point strategy for progressive image sampling”, IEEE Transactions on Image Processing, vol. 6, No. 9, Sep. 1997, 11 pages.

Niv Granot et al., “Drop the GAN: In Defense of Patches Nearest Neighbors as Single Image Generative Models”, 2022 IEEE/CVF Conference on Computer Vision and Pattern Recognition (CVPR), Jun. 2022, pp. 13450-13459, DOI: 10.1109/CVPR52688.2022.01310, XP034192561.

Karpikova Polina et al., “FIANCEE: Faster Inference of Adversarial Networks via Conditional Early Exits”, 2023 IEEE/CVF Conference on Computer Vision and Pattern Recognition (CVPR), Jun. 2023, pp. 12032-12043, DOI: 10.1109/CVPR52729.2023.01158, XP034401167.

Communication issued on Jul. 10, 2025 by the European Patent Office in European Patent Application No. 23888205.4.

Communication dated Jun. 1, 2026, issued by the European Patent Office in European Patent Application No. 23888205.4.

* cited by examiner

SYSTEM AND A METHOD FOR OBTAINING A PROCESSED OUTPUT IMAGE HAVING QUALITY INDEX SELECTABLE BY AN USER

CROSS-REFERENCE TO RELATED APPLICATIONS

This application is a continuation of International Application No. PCT/IB2023/061253 designating the United States, filed on Nov. 8, 2023, in the World Intellectual Property Organization and claiming priority to Russian Patent Application No. 2022129040 filed on Nov. 9, 2022 in the Russian Intellectual Property Office, and to Russian Patent Application No. 2023115413 filed on Jun. 13, 2023 in the Russian Intellectual Property Office. The disclosures of each of these applications are incorporated by reference herein in their entireties.

BACKGROUND

1. Field

The disclosure relates to the field of obtaining a processed image having quality index selectable by an user.

2. Description of Related Art

Generative adversarial networks (GANs) are a class of generative frameworks based on the competition between two neural networks, namely a generator and a discriminator. While the latter performs a classification task (decides whether a generated image is real or not), the former synthesizes an image from a target distribution.

Conditional GANs are a variation of the original framework. Their architecture allows for the input of additional information, which is used to restrict the target space according to it. In this way, the network may be conditioned, for instance, by mask, label, or text.

Recent years have seen the rise of neural head avatars as a practical method for creating head models.

Neural head avatars allow for reenacting a face with given expression and pose. Such models could be divided into two groups—the ones with latent geometry and those with 3d prior, e.g., head mesh.

Additionally, there is a set of papers, targeting the whole human body, including the head and face, which could be divided by input data requirements. Some of them take only few images, others require a video.

Generative DNNs are a powerful tool for image synthesis, but they are limited by their computational load. On the other hand, given a trained model and a task, e.g. faces generation within a range of characteristics, the output image quality index will be unevenly distributed among images with different characteristics. It follows, that it possible to restrain the model's complexity on some instances, maintaining a high quality index.

Image synthesis by GANs received great attention in recent years, its applications span from image-to-image translation to text-to-image rendering, neural head avatars generation and many more. However, this approach suffers from heavy computational burdens when challenged with producing photo-realistic images.

On the other hand, approaches aimed at easing the heavy computational load of DNNs have been applied with great results, significantly decreasing redundant computations. While strategies such as pruning or knowledge distillation generate a DNN with fewer parameters, early exit (EE) is a setup that allows for dynamic variation of the computational burden, and therefore presents itself as an ideal candidate for an image generation strategy aimed at outputting images of consistent quality index, while avoiding excessive computation due to their irregular rendering difficulty.

Despite this, implementing EE strategies has remained out of the scope of studies on generative models. This is perhaps due to the fact that EE processes logits of intermediate layers, thus restricting their field of application to tasks where the latter are meaningful (e.g. in classification), while excluding pipelines in which a meaningful output is given only at the last layer (e.g. generative convolutional networks).

Early exits are a computational-saving strategy employed mainly in classification tasks. They are characterized by the addition of outputs to the DNN, from which an approximation of the final result can be obtained at a lower computational cost. They were rediscovered through the years as a standalone approach, despite being natively implemented in architectures such as Inception as a countermeasure to overfitting. Seldom this approach has also been called cascade learning, adaptive neural network or simply branching. Proposed implementations differ on three design choices: exits' architecture, i.e. what type of layers to use for processing the backbone's logits; where to append exits in order to spread evenly computations among them; and how to choose the computational path. The latter issue is often solved implementing a confidence mechanism and selecting a single exit or reusing predictions for further computations. To a lesser extent, learnable exit policies have been proposed as well.

Changing computational path on a per-input basis has been proposed as a way for efficiently utilizing a single exit during inference. Proposed approach is inspired by a technique pioneered in the field of neural architecture search: the use of a so-called predictor to speed up the performance estimation of a given architecture, as well as in natural language processing, and has been applied to inference through early exits for resource constrained edge artificial intelligence (AI).

Early image synthesis methods were based on the retrieval of examples from large image datasets. This is in contrast with contemporary DNN techniques, which rely on a large number of parameters to output photorealistic images. On the other hand, semi-parametric generation has been proposed in order to exploit strengths of both approaches. In particular, the use of patches, reminiscent of the old methods, seems to achieve great accuracy.

Storing a large image database poses a problem when it comes to querying it in order to extract the needed sample. Looking for guiding images, an algorithm is employed that will quickly find a similar image or patch. To this end, many employ caches and in particular nearest-neighbors search, where pre-trained models are used as visual feature extractors, and the weights of the image encoders are fixed.

SUMMARY

Provided are systems and methods for obtaining output images having a quality index selectable by a user.

According to an aspect of the disclosure, a system for obtaining output images having a quality index selectable by a user, includes: an electronic device including at least one processor and a memory operably connected to the processor and storing input images, a plurality of generative artificial neural networks (GANs) and a plurality of predictors, the at least one processor being configured to implement the GANs and the predictors to perform artificial neural network operations; wherein each GAN of the being selectable by the user from the plurality of GANs stored in the memory, for obtaining an image with predefined quality index, each GAN is pre-trained, and each GAN includes: a plurality of calculating modules forming a backbone, and a plurality of Earlier Exit branches each of which is connected after each calculating module, except for a last calculating module of the backbone, each Earlier Exit branch containing as many calculating modules as remain in the backbone from a connection point of that Earlier Exit branch to a backbone exit, each calculating module of each Earlier Exit branch performing a same function as a corresponding remaining calculating module in the backbone, and a computational budget of each Earlier Exit branch being less than a computational budget of corresponding remaining calculating modules of the backbone to the backbone exit, and wherein each of the plurality of predictors is an artificial neural network, each predictor is generated and pre-trained for one of the plurality of GANs stored in the memory, and each predictor is configured to predict a quality index of a processed image for output of each Earlier Exit branch of the particular GAN based on an input image, which the user intends to apply to an input of the particular GAN, wherein the closer a particular Earlier Exit branch is located to the backbone exit, the higher a computational budget for obtaining a particular output image generated by the particular Earlier Exit branch, wherein quality indexes of output images generated by different Earlier Exit branches are different from each other, and wherein each GAN is configured to output the output images from one of the plurality of Earlier Exit branches, which generates the output image having the quality index most matching the quality index selected by the user.

The electronic device may include a display.

Quality indexes of the output images generated by the plurality of Earlier Exit branches may increase as proximity to the backbone exit increases.

The system may further include a database storing guide data. Each GAN may be further configured to fetch, from the database, guide data corresponding to the input image and to concatenate with input image data inputted to the GAN. The guide data may be concatenated with data from one of the plurality of calculating modules before the Earlier Exit branch, and obtained after concatenating data are fed into the Earlier Exit branch for further processing.

The guide data may be image patches.

The guide data may be image features.

The guide data may be feature patches.

The quality index may be expressed in Fréchet inception distance (FID) units.

According to an aspect of the disclosure, a method for obtaining an output image with a quality index selected by a user, includes: selecting, from a memory by the user, an input image, a pre-trained generative artificial neural networks (GAN), and pre-trained predictor corresponding to the pre-trained GAN, the pre-trained GAN comprising a plurality of calculating modules forming a backbone, a plurality of Earlier Exit branches each of which is connected after each calculating module, except for a last calculating module of the backbone, each Earlier Exit branch containing as many calculating modules as remain in the backbone from a connection point of that Earlier Exit branch to a backbone exit, each calculating module of each Earlier Exit branch performing a same function as a corresponding remaining calculating module in the backbone, and a computational budget of each Earlier Exit branch being less than a computational budget of corresponding remaining calculating modules of the backbone to the backbone exit; selecting, by the user, the quality index for the output image; feeding the input image converted to predictor input data to be processed by the pre-trained predictor, to the pre-trained predictor; predicting based on the input data, by the pre-trained predictor, predicted quality indexes for potential output images, which would be generated by each of the plurality of Earlier Exit branches of the pre-trained GAN; selecting one Earlier Exit branch whose output image has a potential quality index most matching the quality index selected by the user; converting the input image into GAN input data to be processed by the pre-trained GAN; feeding the GAN input data to the pre-trained GAN with the one Earlier Exit branch for processing; processing the GAN input data by the pre-trained GAN with the one Earlier Exit branch; and obtaining, on exit of the one Earlier Exit branch, the output image.

The method may include storing in the memory the output image.

The method may include displaying, on a display of an electronic device, the output image.

The quality indexes of output images generated by the plurality of Earlier Exit branches may increase as proximity to the backbone exit increases.

The quality index may be expressed in Fréchet inception distance (FID) units.

According to an aspect of the disclosure, a method for obtaining an output image with a quality index selected by a user includes: selecting, from a memory by the user, an input image, a pre-trained generative artificial neural networks (GAN), and pre-trained predictor corresponding to the pre-trained GAN, the pre-trained GAN comprising a plurality of calculating modules forming a backbone, a plurality of Earlier Exit branches each of which is connected after each calculating module, except for a last calculating module of the backbone, each Earlier Exit branch containing as many calculating modules as remain in the backbone from a connection point of that Earlier Exit branch to a backbone exit, each calculating module of each Earlier Exit branch performing a same function as a corresponding remaining calculating module in the backbone, and a computational budget of each Earlier Exit branch being less than a computational budget of corresponding remaining calculating modules of the backbone to the backbone exit; selecting, by the user, the quality index for the output image; feeding the input image converted to predictor input data to be processed by the predictor, to the pre-trained predictor; predicting based on the input image, by the pre-trained predictor, predicted quality indexes for potential output images, which would be generated by each of the plurality of Earlier Exit branches of the pre-trained GAN; selecting one Earlier Exit branch whose output image has a potential quality index most matching the quality index selected by the user; converting the input image into GAN input data to be processed by the pre-trained GAN; and feeding the GAN input data to the pre-trained GAN with the one Earlier Exit branch for processing. The method further includes processing the GAN input data by the pre-trained GAN with the one Earlier Exit branch, and during the processing: fetching, from a database storing guide data, fetched guide data corresponding to the input image, concatenating the fetched guide data with data output from one of the calculating modules preceding the one Earlier Exit branch to generate concatenated data, and feeding the concatenated data into the one Earlier Exit branch or into the backbone for further processing. The method further includes obtaining, on exit of the one Earlier Exit branch, the output image.

The method may further include displaying, on a display of an electronic device, the output image.

Quality indexes of output images generated by the plurality of Earlier Exit branches may increase as proximity to the backbone exit increases.

The quality index may be expressed in Fréchet inception distance (FID) units.

The guide data may be image patches.

The guide data may be features.

The guide data may be feature patches.

The resulting processed image can be, for example, displayed on the display of the electronic device. The images can be stored into the database by the user in advance based on the original images selected from the memory.

Proposed is a computer-readable medium storing instructions for performing the any of the proposed methods by an electronic device.

At least one of the plurality of calculating modules may be implemented through an AI model. A function associated with AI may be performed through the non-volatile memory, the volatile memory, and the processor.

The processor may include one or a plurality of processors. At this time, one or a plurality of processors may be a general purpose processor, such as a central processing unit (CPU), an application processor (AP), a graphics processing unit (GPU), a visual processing unit (VPU), and/or an AI-dedicated processor such as a neural processing unit (NPU), or the like.

The one or a plurality of processors control the processing of the input data in accordance with a predefined operating rule or artificial intelligence (AI) model stored in the non-volatile memory and the volatile memory. The predefined operating rule or artificial intelligence model is provided through training or learning.

Here, being provided through learning means that, by applying a learning algorithm to a plurality of learning data, a predefined operating rule or AI model of a desired characteristic is made. The learning may be performed in a device itself in which AI according to an embodiment is performed, and/o may be implemented through a separate server/system.

The AI model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

Meanwhile, the proposed method performed by the electronic device may be performed using an artificial intelligence model.

The artificial intelligence model may be obtained by training. Here, "obtained by training" means that a predefined operation rule or artificial intelligence model configured to perform a desired feature (or purpose) is obtained by training a basic artificial intelligence model with multiple pieces of training data by a training algorithm. The artificial intelligence model may include a plurality of neural network layers. Each of the plurality of neural network layers includes a plurality of network parameter values and performs neural network computation by computation between a result of computation by a previous layer and the plurality of the parameter values.

Visual understanding is a technique for recognizing and processing things as does human vision and includes, e.g., object recognition, object tracking, image retrieval, human recognition, scene recognition, 3D reconstruction/localization, or image enhancement.

Prediction of reasoning in Artificial Intelligence is a technique of logically reasoning and predicting by determining information and includes, e.g., knowledge-based reasoning, optimization prediction, preference-based planning, or recommendation.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
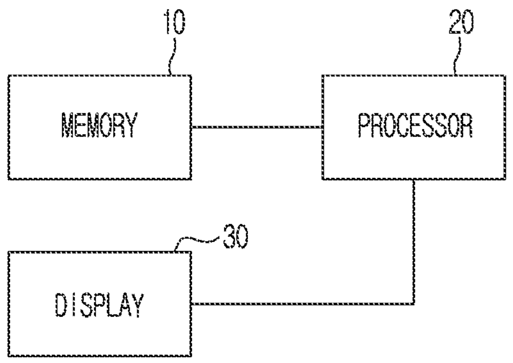
FIG. 1A illustrates an electronic device according to one or more embodiments.

The present disclosure stems from the observation that deep neural networks (DNNs) output images with different but consistent quality index when conditioned on parameters. Since their expressivity is uneven within the set of possibly generated images, it follows that for some examples, a simpler DNN may suffice in generating an output with the required quality index.

One or more embodiments of the disclosure may accelerate the operation of generative neural networks, enable neural networks to work faster or to lower energy consumption when the desired output frequency is reached. One or more embodiments may enable lowering power consumption, electrical consumption and heating of devices used for running the neural network, such as discrete graphic cards for PC, servers or notebooks, or smartphone's System on Chip (SoC).

The disclosure is applicable to any neural networks designed to generate images based on a latent vector whose architecture consists of a plurality of blocks. Blocks 11, 12, 13, 14 in FIG. 1B are modules of the neural network architecture. Each block performs the function of a small neural network, transforming inputs according to multiplication by weights, adding biases, and applying a non-linear activation function and other operations. Namely, the disclosure can be applied to any multilayer neural networks, this includes any GAN.

One or more embodiments of the disclosure make it possible to speed up the operation of neural networks, or to reduce power consumption when the required real-time output frequency is reached. Also, the disclosure allows to reduce the load, power consumption and heating of devices, which are used to execute the neural network and the disclosure is used in devices such as a discrete video card for a PC, a server, or a laptop, as well as an SoC for a smartphone, as well as in any electronic device that has a central processing unit. Also, according to one or more embodiments, a computer-readable medium stores computer code for executing the method by a computer or suitable electronic device. At that, the electronic device may comprise a display, a memory storing images and a set of artificial neural networks (ANN), also the electronic device is configured for performing operations of an artificial neural network.

One or more embodiments of the disclosure allow diminishing computations by adding so-called early exit branches to the original architecture (the backbone) and dynamically switching the computational path depending on how difficult it will be to render the output. The backbone is any generative model that uses a decoder, namely, a neural network that takes a latent vector and emits a result, usually after signal processing by several layers. Difficulty is determined by quality index of the original image (sets of input data). The worse the quality index of the original image, the higher the difficulty. Quality index is measured by common image metrics (FID, LPIPS). Several paths with a different number of parameters are created, and training an neural network, called the Predictor, is performed to predict what quality index of the images will be obtained from each path. When the user sets a lower quality index when generating images, the Predictor proposes the easiest way to satisfy this requirement.

It should be noted that the neural network operates with data tensors, therefore the images to be input in the neural network and processed within the neural network should be converted into data tensors. The operation of converting images into tensors are generally known in related art and is not considered in the present application.

Therefore, in the description below, the term "input image" implies use of the term "data tensors" obtained by conversion of the input images for further processing by the neural network.

One or more embodiments of the disclosure show possibility to output images with custom lower predefined quality index of the output images, and it can be applied wherever there is a model that generates images using a decoder. Considered are, as examples, the application of the method to generation from a semantic map (known from the related art is used) and cross reenactment of face expressions. Generation of an image from a semantic map is the task of generating an image with a list of all pixels belonging to a class as input. For example, for a photo of a street, the semantic map contains a list of all the pixels that should contain the road, trees, buildings, and so on. The cross reenactment of face expressions is a task in which two portraits are input, one specifies the personality and the second specifies the expression and position of the head contributing to the first personality. According to the disclosure for a LPIPS (Learned Perceptual Image Patch Similarity) quality index≤0.1 of a neural network generated image, neural network calculations can be reduced by up to half (compared to the original backbone).

The method according to one or more embodiments employs an "Early Exit" strategy for image synthesis, dynamically routing the computational flow towards the needed Early Exit branches in accordance to images' complexity, therefore reducing computational redundancy while maintaining desired quality index predefined by user.

Exit branches of the Early Exit are attached to the original main independent artificial neural network (referred as a backbone consisting of an input, calculating modules and an exit), as portrayed in FIG. 1B. Calculating modules of the Early Exits are marked $\tilde{l}_i$ with corresponding numbers in ascending order of quality index (marked as 1, 2, 3, in circles, herein 4 in circle is exit of the backbone). These calculating modules $\tilde{l}_i$ are built of lightweight version, i.e. with less parameters, of the calculating modules constituting the backbone architecture, their complexity can be tuned in accordance with the desired quality index predefined by user. The fewer parameters in the network, the less calculations will be made, the quality index of the output will suffer from this, and therefore exits are created with a balance between loss of quality index and acceleration of calculations.

Figure 1B:
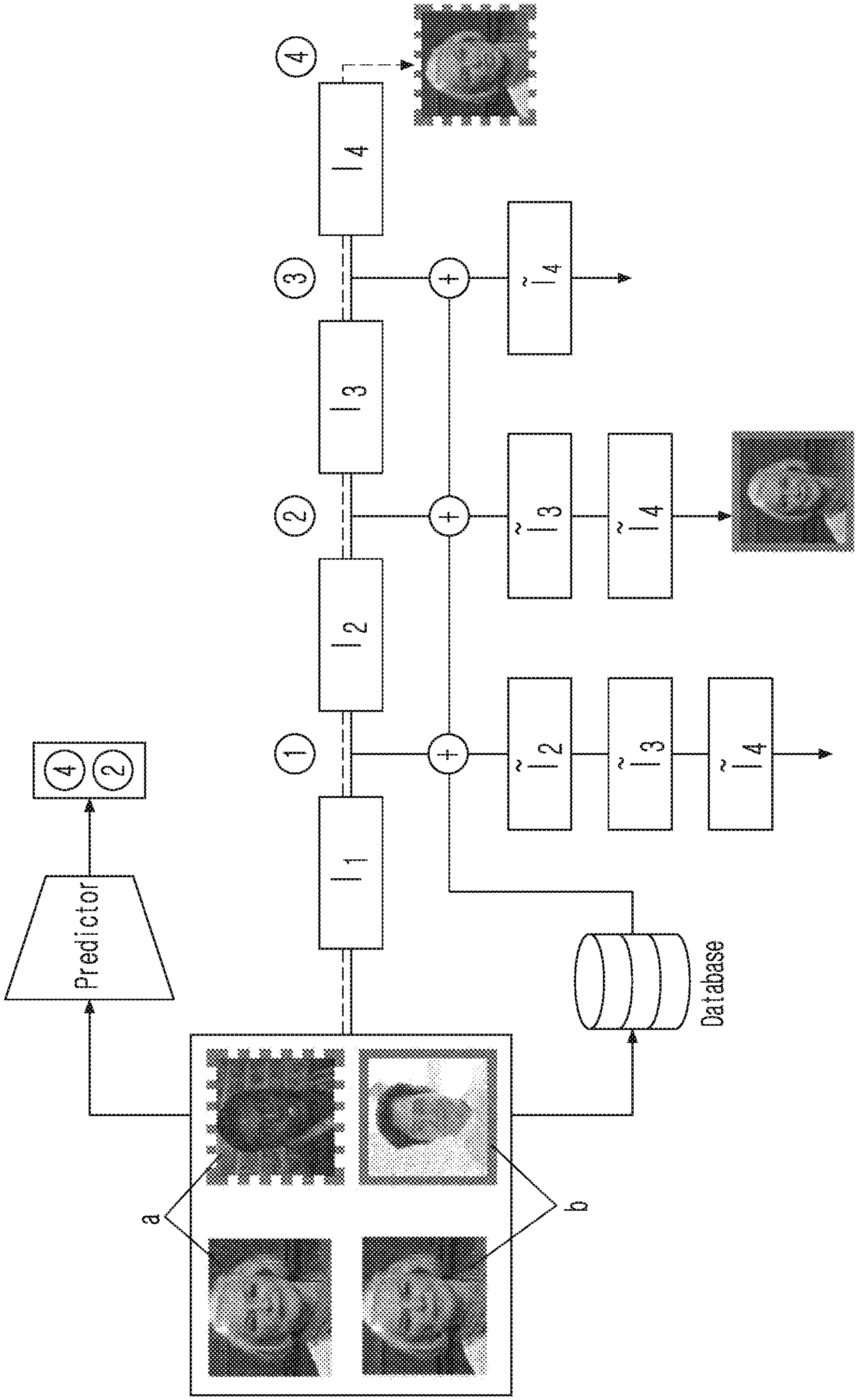
FIG. 1B illustrates example of a system for obtaining a processed image having quality index selectable by an user, according to one or more embodiments.

FIG. 1A illustrates an electronic device according to one or more embodiments and FIG. 1B illustrates an example of a system for obtaining a processed image having quality index selectable by an user (predefined quality index), according to one or more embodiments. The electronic device includes a memory 10, a display 30, and a processor 20 operatively connected to the memory 10 and the display 30. The processor 10 may be a plurality of processors. The system contains artificial neural networks (ANN), in particular including GANs. The memory of the electronic device contains a plurality of GANs for different tasks. Each GAN stored in the memory contains N calculating modules, forming a backbone, and a number of Earlier Exit branches each of which is connected after each calculating module of the backbone, except of the last calculating module of the backbone. Each Earlier Exit branch contains as many calculating modules as they remain in the backbone after the connection point of the Earlier Exit branch up to the backbone exit. Each calculating module of each Earlier Exit branch performs the same function as the corresponding remaining calculating module in the backbone. The computational budget (the number of calculations) of each Earlier Exit branch is less than the computational budget of the corresponding remaining calculating modules of the backbone up to the backbone exit.

For example (see FIG. 1B), the backbone generator is composed of calculating modules $l_1$ through $l_4$. Each Earlier Exit branches are connected after each calculating module of the backbone (exits 1, 2, 3 in circles in FIG. 1B). Three Early Exits branches are illustrated in FIG. 1B, thus adding early exits 1, 2, 3. Each Earlier Exit branch contains as many calculating modules $\tilde{l}_i$ as they remain in the backbone after the connection point of the Earlier Exit branch up to the backbone exit. Each calculating module $\tilde{l}_i$ of each Earlier Exit branch performs the same function as the corresponding remaining calculating module $l_i$ in the backbone. The closer a particular Earlier Exit branch is located to the backbone exit the higher the computational budget for obtaining the processed image and the quality index of the processed image generated by the particular Earlier Exit branch.

As shown in FIG. 1B each branch has a different depth (the depth is the number of calculating modules), and is composed of lightweight calculating modules $\tilde{l}_i$, that is the calculating modules that contain fewer parameters than the calculating modules of the backbone, although their structures are similar.

For example (this example does not limit the application of the disclosure), the input data for the backbone is 2 images, selected by the user from the memory of the electronic device. One image whose personality needs to be saved and the second image whose facial expressions need to be saved. The output should be the first personality with the second facial expressions. The memory contains pre-prepared backbone with connected pre-trained Early Exit branches at the output of which the quality index of the resulting image is inferior to the image quality index obtained during backbone operation, and the computational budget of each branch is much less than the computational budget of the original backbone. The user retrieves from the memory of the electronic device the GAN, that is backbone with connected Early Exit branches, wherein the backbone is suitable for processing images selected by the user from the memory. At that, selected backbone can perform processing with obtaining a resultant image having the highest quality index, wherein calculating modules of the backbone having a high computational budget are used to obtain the highest quality index image.

Memory of the electronic device also contains a set of predictors, each being an artificial neural network. Each predictor is generated and pre-trained for particular GAN stored in the memory. The predictor is configured to predict the processed image quality index for each output of each Earlier Exit branch of the particular GAN based on the original image, which the user intends to apply to the input of the particular GAN. The predictors are grouped with the corresponding backbone with connected Early Exit branch in the memory.

For example, the user selects two images from the memory of the electronic device. One is a source, it is an image of a person whose appearance user wants to save (a human on the left (images (a) or (b)), as example in FIG. 1B), the other is a driver, it is any another photograph of the face whose facial expressions user wants to convey, (it is image of the human on the right (images (a) or (b)) as example in FIG. 1B)). That is, in the example shown in FIG. 1B of the image of the human on the left (images (a) or (b)) is taken as a personality that is displayed with the facial expressions of the human on the right (images (a) or (b)).

FIG. 1B shows, for example, computational path for two distinct inputs:

- first input (images a)—the source is the human on the left (image (a)), the driver is the human on the right (images (a));
- second input (images b)—the source is the human on the left (image b), the driver is the human on the right (image b).

Each images (a) and (b) treated separately, in FIG. 1B they are shown together for illustration purposes only.

The user selects image (a) from the memory. The already prepared and pre-trained GAN (the backbone with the connected Early Exit branches), as well as the corresponding pre-trained predictor, are already stored in memory for solving such an image processing task. Therefore, the user selects the suitable GAN along with a predictor from memory after selecting images.

The user selects desirable a quality index for processed output image. Image of the human on the right from images (a) is fed to the predictor. The predictor predicts image quality index for image generated by the backbone and each Earlier Exit branch of the selected GAN. When processing images (a) by GAN, the Earlier Exit branch will be used, that generates processed output image having quality index most matching (or matching) the quality index selected by the user.

To obtain an image with the highest quality index, in case the user has initially desired, the backbone will be used without using the Early Exit branches.

For example, in FIG. 1B for the highest quality index requested by the user for images (a), the whole backbone will be used without using any Earlier Exit branches (exit number 4). For the quality index requested by the user for images (b), the backbone with Early Exit branch number 2 will be used, since according to the predictions of the predictor quality index of the output image of the Earlier Exit branch with the exit number 2, in this case, has been the most matching the quality index selected by the user.

Examples of images coming out after $l_1$ or $l_3$ are not shown.

For the given examples (a) and (b) the task of the neural network is to replace the image of the head of the second person (the driver) in the second image or video with the head of the first person (the source). When submitting video it will replace the head of the driver with the head of the source, not only for one image, but throughout the entire video.

A resulting processed image, outputted from the exit of the backbone or of the one Earlier Exit branch that provides the predefined quality index, are displayed, for example, on the display of the electronic device. The more complex the image, the more calculations are needed to obtain the required predefined quality index.

The predictor is DNN trained in advance on the outputs of the proposed branches, and capable of indicating the exit needed for outputting an image of a predefined quality index. The predictor is trained by supervised learning, imposing minimum squared error loss between its predictions and the actual quality index. The predictor is trained on examples and can predict what quality index all Early Exits connected with the backbone will give for a given input images. Thus, output 4 is assigned to a more complex image (a) in order to maintain the required quality index. The bottom input image (b) (solid line), instead, needs only exit 2 to maintain the required quality index predefined by the user.

When operating the image of driver is passed through the predictor, and the sequence numbers of Early Exits are received, which, according to the predictor's prediction, can provide the required predefined quality index of the exit image, set in advance. The blocks (for example 11, 12, 13, 14 in FIG. 1B) of the main neural network (backbone) to which the method is applied, they require no modification. The Early Exit branches ensure that the final image exits the network earlier than a normal exit of the backbone without the Early Exit branches.

The image quality index is calculated using common measures (LPIPS, FID), and the predictor is an auxiliary network that has been trained on examples and the predefined quality index of the generated image.

In summary, once the input image data is given by the user, the predictor calculates what generation quality index each output will have. Thus, it becomes possible to choose the fastest (from the point of view of calculations) exit from those who satisfy the given quality index condition.

The predictor is an absolutely independent neural network. Its output is a list of image quality index generated by all Early Exits for a given input. The predictor is used by the method to select the output with the quality index most matching the quality index selected by the user. The predictor determines the output quality index in the form of an LPIPS metric (known in the art).

The number of the calculating modules (i.e. depth) of the Early-Exit varies in accordance to the number of backbone modules left after the Early-Exit gets attached to. In this way, intermediate backbone logits are fairly processed, wherein the calculations are faster, since calculating modules of the Early-Exit have fewer parameters than backbone calculating modules. The number of calculating modules of the Early-Exit is equal to the number of calculating modules that remained at the backbone that is, unclaimed calculating modules of the backbone. That is, for example, if there are 4 calculating modules left from the attachment point of the Early-Exit to the end of the main path, the Early-Exit will have 4 calculating modules.

The following property is supported: the computational budget of the Early Exit branch output in total with the computational budget of the preceding ones in the block diagram of the backbone is always less than the computational budget of the Early-Exit output with a higher serial number. This condition is important in order to have a number of outputs with a growing number of calculations and, accordingly, with improved quality index.

The system can further contain a database of guiding data (examples) storing guide, from which guiding examples, having, for example, image of the person that matches the image of a person on the input image source (a human on the left (images (a) or (b)) in FIG. 1B) are extracted and fed to each branch. Wherein the person's pose in the guiding image is closest to the person's pose in the driver's input image, but has the appearance of the source (a human on the left (images (a) or (b)) in FIG. 1B). For one task, one example is extracted, that is, one example per pass. Examples database are formed in advance for each task, for example by the user.

For both examples (a) and (b) in FIG. 1B, an guiding image of the human on the left (images (a) or (b)) is retrieved from the database, in order to improve the generation quality index. To improve the generation quality index the guide data are concatenated with data from a calculating module before the Earlier Exit branch, and concatenated data are fed into the Earlier Exit branch for further processing.

For example, if a user wants to get his image with the pose of another person depicted in another image, then the user first compiles a database of the guiding examples of his own photos in different poses (photos at different angles), then feeds any of user image (source image) and an image with another person (driver image) to the input of the neural network with Early Exit. When a neural network with Early Exits operates, the guiding example of the user images is selected from the database of the guiding examples formed by the user, in which the user is depicted in a pose that most closely matches the pose of the driver image. If the user wants to get a video with his own images (source images), but with the poses of another person (driver images), then the neural network with early exits processes each image from the video sequence separately, extracting from the database of the guiding examples for each frame the user's image (source image) with the pose closest to the person's pose on the corresponding frame (driver image) of the video sequence submitted at the moment to the input of the neural network with early outputs.

Presence of database of the guiding examples yields a quality index gain for Earlier Exits branches, at the expense of a small amount of memory and computations, thus harmonizing exits' output quality index. This is extremely handy for settings where real-time rendering is needed and guiding examples can be readily provided, such as neural avatar generation. This is the task of generating an avatar—a virtual image of a person. For example, a user wants in real time, during a digital conference, to impose a different personality on his face, while maintaining all his reproducible facial expressions. In this case, the user can take an image of his face in advance from different angles and upload it to the database. This will greatly help the generation, but is not an absolutely necessary operation.

The method is applicable to both untrained and already trained models, but requires additional training for the newly introduced components.

The backbone is always fixed, and the Predictor only indicates the output at which the quality index required by the user will be obtained. It should be noted that during the operation of the GAN (backbone and Earlier Exit branches), only the branch of the Early Exit is used, which gives the output image of the required quality (which is the most matching the quality index selected by the user) at the output. To do this, any suitable and known from the related art switch mechanism is implemented in the code, so all other branches of the Early Exit, that are not required for the execution of the selected early exit, are not used.

The method can be applied to any generation tasks, with the presence of a generator, i.e. a neural network that creates images from a latent vector. The main result may be summarized in this way: method is easily applicable to already existing and trained generative models, containing a generator (backbone), i.e. a neural network that creates images from a latent vector.

The method is capable of outputting images with custom lower quality index threshold by routing easier images to shorter computational paths, and the main gain in terms of saved computations per quality index loss is, respectively, $1.2\times10^3$, and $1.3\times10^3$ GFLOPs/LPIPS for the two applications.

In other words, thanks to the disclosure, it is possible to reduce the number of calculations due to the loss of quality index. The more calculations reduced by a "unit of quality index" (it is measure in LPIPS), the better.

The GANs are composed by two competing DNN: a generator G and a discriminator D. The generator G is designed to synthesize arbitrary images when given a low dimensional random vector of features: $G{:}z\rightarrow g$, where z is the input and g is the generated image. The discriminator D learns to distinguish between the generated images' distribution $p_g=G(p_z)$ and the one of the original examples $p_{data}$. Their objectives can be summarized in the form of a minimax game (the minimax game is known from the related art, and means a decision rule for minimizing possible losses from those that the decision maker cannot prevent in the worst case scenario):

$$\min_G \max_D \mathcal{L}_{Adv}(G, D) = \mathbb{E}_{x\sim p_{data}}[\log D(x)] + \mathbb{E}_{z\sim p_z}[\log D(G(z))]. \quad (1)$$

Where $\mathcal{L}_{Adv}(G, D)$ is the loss function the weights of Generator G have to minimize, and the weights of Discriminator D have to maximize; $\mathbb{E}_{x\sim p_{data}}[\log D(x)+ \mathbb{E}_{z\sim p_z} \log D(G(x)]$ is the expected value of the expression "$[\log D(x)]+ \mathbb{E}_{z\sim p_z}[\log D(G(z)]$" when the random variable x is drawn with probability distribution p; D(x) and G(z) are the outputs of the Discriminator D and Generator G.

By providing conditions c (e.g. in the form of labels) to both generator and discriminator, the former can learn to synthesize images from a subspace of $p_g$: $G(p_z, c)=p_g(c) \subset p_g$. Where G(x) is the generator's output; $p_z$ and $p_g$ are probability distributions of input noise and output images; and c is the conditioning parameter. Any GAN generator is composed by a series of convolutional modules labeled $l_i$. The output of each module, namely $l_k \circ l_{k-1} \circ \ldots \circ l_1(z, c)$ constitutes a candidate for an early exit, but it is not a rendered image. For this reason, it is processed by a series of additional convolutions, before an image can be retrieved from it. These new convolutional $\bar{l}_i$ calculating modules constitute what calls a branch, this is the Early Exits.

For a backbone built out of N calculating modules, after calculating module k, appended is a branch of length N−k. The branches' calculating modules are less complex, than the backbones', their width, i.e. number of channels, is decreased. In this way, at the output of each branch $\bar{l}_N \circ \ldots \circ \bar{l}_{k+1} \circ l_k \circ l_{k-1} \circ \ldots \circ l_1(z, c)$, retrieved is an image rendered with a lesser number of computations than at the backbone's output is retrieved. Each Early Exit branch is trained in advance by adversarial loss with copies of the backbone original discriminator.

During the inference phase, having a set of trained branches, each image can be synthesized through a different exit. Given a predefined quality index, the branch that will achieve it and performing the least possible calculations is selected. There is a single quality index threshold (that is, the predefined quality index specified by the user) for all branches, the branch that will output images with equal or higher quality index is selected (i.e. quality index most matching the quality index selected by the user), while performing the least possible amount of calculations. In order to this, employed is the predictor P, constituted by convolutional and fully connected layers. The predictor is trained by supervised learning, using input conditions c as training examples, and vectors of LPIPS scores S for images generated by branches as labels. It should be noted that training to create a semantic map and training to create a cross-reproduction of facial expressions are no different.

$$\mathcal{L}_{pred}(z,c;S)=\|P(z,c)-S\|^2. \quad (2)$$

Where c are the conditioning parameters; S is the LPIPS score for an image generated with aforementioned parameters; and P(z, c) is the predictor's output.

In this way, by feeding an input to the trained predictor, it is possible to get an estimation of each branch's output quality index, and thus, use this information to route the computational flow toward the exit which performs the least computations, while upholding the quality index threshold.

To further improve synthesis quality index, a purely parametric method is shifted to a semi-parametric, in which the generating process is guided by data patches, that is data fetched from the database. Data, processed by the calculating modules of the backbone, which are located before the calculating modules of the Early Exit branch, are under processed tensors. To further improve synthesis quality index, the under processed tensors are concatenated with the data patches before feeding into the Early Exit branch.

This ensures an increase in quality index more prominent in earlier exits, which are the fastest, but suffer the most from the quality index decrease due to their lower number of parameters. By adding a moderate amount of memory and computations, achieved are better results, harmonizing the output quality index of different branches.

For example, in the database, stored is a collection of tensor pairs as the guide data, called key-values pairs. In this case, the guide data are generated by the backbone when the database is formed. When the image generation process is occurring, the guide data is already in the database and are being retrieved from the database during the GAN operation when generating the image. Keys are obtained by applying to the original data all the trained layers of the backbone prior to the first Early Exit branch, and cutting the obtained tensors, called guide features, into non-overlapping patches. In other words, the keys are obtained as follows: data of the original images is fed into the backbone, the result before the first Early Exit branch is divided into patches and these patches are the keys. Values are obtained by applying the trained layers of the backbone to the original images and cutting the resulting features into data patches, by dividing into N patches. It has been observed that an improved result is obtained when applying the trained layers of the backbone up to its middle to the original images. Based on the input data, the database is searched for the most similar images from those stored there. The whole image is looked for in data patches. To do this, the inputs are processed by several layers of the original network backbone in order to reduce dimension of the input images, and search for similar ones faster. When a similar patches is found, the found patch is sent to the Early Exit branch.

During inference, processed is each input through the backbone, up to the layer prior to the first branch. It is taken the resulting features, cut them into data patches, and for each data patch searched the database for the closest key. Once the values corresponding to all data patches are retrieved, they glue together and concatenate the obtained features to the input of each branch. Having all the keys of the auxiliary data (in FIG. 1B it is image of the human on the left (images (a) or (b)) for the most similar one, and feed the corresponding processed data to the early output input.

This is done to improve the quality index of the generation, which especially helps early exits located closer to the beginning of the backbone.

To quantify the success of the method, a simple measure of the saved computations is introduced. As measure units it is necessary to use, respectively, GFLOPS (Floating point operations) and LPIPS. For instance, in the cross reenactment of face expressions, a mean quality index gain of $1.3\times10^3$ GFLOPS/LPIPS is achieved, meaning that lowering the quality index threshold by +0.01 LPIPS will yield a decrease of 13 GFLOPS.

The method can be applied to a multitude of DNN for different synthesis tasks. To showcase its generality, for example, it is applied to two distinct image synthesis tasks:

1) synthesis of outdoor photos, starting from a semantic label map, based on the OASIS architecture starting from a semantic label map, taking as backbone the OASIS architecture;
2) cross reenactment of face expressions, neural head avatars synthesis, starting from an image that acts as the avatar's target expression and position, and using as backbone the MegaPortraits architecture.

For the first example the pipeline is implemented taking as backbone the OASIS model. The OASIS generator consists of 6 SPADE ResNet modules, which constitute the backbone calculating modules $l_i$, $i\in[1, 6]]$. Four branches are appended, one after each backbone module $l_1$ to $l_4$. The branches' calculating modules $\tilde{l}_i$ were SPADE ResNet modules as well, and their length varied in order to preserve $k+len=6\forall k\in[\![1, 4]\!]$, where len is the number of the calculating modules of the Early Exit, k is the exit number. That is, if the exit number k is 2, then the number of the calculating modules of the Early Exit branch is 4.

The branches' calculating modules of the Early Exits constituted a lightweight variant of the backbone calculating modules since their width is reduced, i.e. number of channels, by imposing a scale factor (SF) s=½, ⅓, ¼ in order to reduce computations.

Thus created are a total of five computational routes for each scale factor for backbone the OASIS model, their GFLOPs (Floating point operations) are listed in Table 1.

TABLE 1

| SF | 1 | 2 | 3 | 4 | BB |
|---|---|---|---|---|---|
| 1/2 | 157 | 171 | 193 | 227 | 319 |
| 1/3 | 137 | 154 | 182 | 227 | |
| 1/4 | 120 | 138 | 168 | 227 | |

Table 1 illustrates comparison between GFLOPs of all 5 computational routes through branches 1-4 and the OASIS backbone (BB (backbone), rightmost column). Different rows correspond to different scale factors (SF). As can be seen from the table, the SF does not equally affect all calculating modules, since imposed is a minimum number of channels equal to 64 after which no further scaling is imposed. It should be noted that the number 64 is set arbitrarily, and changes in subsequent tests. The channel is a standard terminology, RGB images have 3 channels, convolutional networks create other channels depending on their architecture, in general, this is a network parameter that needs to be reduced.

For the implementation of method trained are all branches and the predictor. Each branch is trained by imposing adversarial losses, as in Eq. (1), generated by competing against copies of the OASIS discriminator. Alongside, imposed are VGG and LPIPS losses using as ground truth the image synthesized by the backbone.

$$\mathcal{L}_{Branch}=\mathcal{L}_{OASIS}+\alpha\mathcal{L}_{VGG}+\beta\mathcal{L}_{LPIPS}, \quad (3)$$

Where $\mathcal{L}_{Branch}$ is the total loss, composed of the original loss $\mathcal{L}_{OASIS}$, alongside VGG$\mathcal{L}_{VGG}$ and LPSPS$\mathcal{L}_{LPIPS}$ losses. α and β are hyperparameters choosing in order to equalize the losses' contribution; where the overall learning rate was set to $4\times10^{-4}$ and the coefficients were set to α=10 and β=5 in order to equalize the losses' contribution. The discriminators retained their original losses. Both the generator and the discriminators were trained via Adam optimization with β1=0, β2=0.999. The computations were performed using distributed data parallel from the PyTorch library onto 2 P40 NVIDIA GPUs with batch=2 and lasted approximately 6 days. The resultant qualities can be found in Table 2 and Table 3.

TABLE 2

| | | Branch 1 | | Branch 2 | | Branch 3 | | Branch 4 | |
|---|---|---|---|---|---|---|---|---|---|
| SF | Bank | FID↓ | mIOU↑ | FID↓ | mIOU↑ | FID↓ | mIOU↑ | FID↓ | mIOU↑ |
| 1/2 | x | 64.2 | 59.8 | 59.3 | 62.6 | 55.9 | 62.2 | 50.1 | 64.2 |
| | ✓ | 52.8 | 67.5 | 51.8 | 68.7 | 49.5 | 68.5 | 48.1 | 69.3 |
| 1/3 | x | 65.9 | 61.4 | 59.5 | 61.6 | 57.2 | 65.2 | 53.1 | 69.4 |
| | ✓ | 54.1 | 65.5 | 53.6 | 69.6 | 50.6 | 68.8 | 48.4 | 69.6 |
| 1/4 | x | 69.6 | 57.5 | 62.2 | 61.8 | 56.4 | 65.5 | 53.0 | 68.3 |
| | ✓ | 54.9 | 65.5 | 54.4 | 67.1 | 53.0 | 66.7 | 49.7 | 69.4 |
| | | | Backbone | | | | | 47.7 | 69.3 |

GFLOPs defines the number of operations that are performed in one run. The more parameters, the more operations, because we will multiply these parameters and so on. Different SFs reduce the number of parameters in different ways. BB is a backbone, given in the table for comparison, it is not affected by the quality index factor. SF is the compression ratio, if the original calculating module had N channels, then there will be N*SF in noms, so compression. 64 is an arbitrary number. Channels are part of the architecture of convolutional networks.

Table 2 describes quantitative results for the OASIS pipeline. The minimum number of channels is 64. At that, the minimum number of channels sets the lower quality index threshold. For three different scale factors SF (first column), the pipeline is tested with and without the guiding database, shown in the Bank (database) column as a tick (with the guiding database) or a cross (without the guiding database). Four columns, one for each branch, contain the FID (Fréchet inception distance, quality index metric) and mIOU (mean intersection over union, quality index metric) scores; at the bottom are reported these two values for the Backbone. From table 2, it can be concluded that adding the database improves the quality index of the first outputs more than the last ones. It also simply shows how the compression ratio affects quality index. Any compression is suitable, you need to choose depending on what quality index is required. The smaller the FID parameter, the higher the quality index. The higher mIOU, the higher the quality index.

From the table 2, it can be concluded that adding the database improves the quality index of the first outputs more than the last ones. It also simply shows how the compression ratio affects quality index. Any compression is suitable, user needs to choose depending on what quality index is required for the user. The table 2 shows that the largest scaling factor, at which the number of parameters remains large enough, gives better results with the database (FID=52.8; mIOU=67.5) than without the database (FID=64.2; mIOU=59.8). In addition, the fewer parameters (S=¼) in the same branch of the Early Exits (Branch 1), the worse the quality index of the output image. However, with the database present (FID=54.9; mIOU=65.5), the output image quality index is better than without the database (FID=69.6; mIOU=57.5). Also, the closer the Early Exit branch is to the backbone exit, the better the image quality index, but also the quality index of the output image with a database is better than without a database. The output image quality index for a backbone without Early Exits branches is the better than that of the Early Exit branches.

TABLE 3

| | | Branch 1 | | Branch 2 | | Branch 3 | | Branch 4 | |
|---|---|---|---|---|---|---|---|---|---|
| SF | Bank | FID↓ | mIOU↑ | FID↓ | mIOU↑ | FID↓ | mIOU↑ | FID↓ | mIOU↑ |
| 1/2 | x | 58.8 | 62.8 | 58.3 | 63.3 | 53.2 | 66.9 | 51.3 | 69.0 |
| | ✓ | 52.3 | 65.6 | 51.4 | 67.8 | 49.6 | 67.3 | 48.6 | 67.8 |
| 1/3 | x | 66.8 | 57.1 | 60.7 | 62.6 | 52.8 | 65.9 | 51.9 | 66.7 |
| | ✓ | 55.2 | 66.7 | 54.1 | 66.1 | 53.1 | 67.0 | 51.9 | 68.3 |
| 1/4 | x | 69.5 | 59.7 | 60.8 | 61.4 | 58.4 | 65.1 | 54.4 | 67.4 |
| | ✓ | 57.7 | 65.9 | 57.4 | 66.7 | 55.3 | 67.5 | 51.2 | 67.7 |
| 1/6 | x | 69.5 | 56.7 | 65.2 | 62.1 | 61.9 | 65.1 | 54.0 | 66.4 |
| | ✓ | 60.6 | 67.6 | 58.1 | 66.8 | 57.6 | 67.0 | 51.4 | 68.9 |
| | | | Backbone | | | | | 47.7 | 69.3 |

Table 3 describes quantitative results for the OASIS pipeline at different scale factors. The minimum number of channels is 32. For 4 different scale factors SF, the pipeline is tested with and without the guiding database, shown in the Bank column as a tick or a cross. Four columns, one for each branch, contain the FID (Fréchet inception distance) and mIOU (mean intersection over union) scores; at the bottom are reported these two values for the Backbone. It can be concluded that adding a bank improves the quality index of the first outputs more than the last ones. It also simply shows how the compression ratio affects quality index. Any compression is suitable, you need to choose depending on what quality index you want to have.

From Table 3, as well as from Table 2, it can be seen that adding the database improves the quality index of the output image, and an increase in scale factors SF worsens the quality index of the output image, in addition, the higher the output number of the Early Exit branch, the higher the quality index of the output image.

The OASIS predictor was trained to output images' quality index for each branch. Imposed is minimum squared error loss between its predictions and the actual qualities, as noted above:

$$\mathcal{L}_{pred}(z,c;S)=\|P(z,c)-S\|^2. \quad (2)$$

Where c are the conditioning parameters; S is the LPIPS score for an image generated with aforementioned parameters; and P(c) is the predictor's output.

The learning rate was set to 0.01, the loss was optimized via stochastic gradient descent with cosine scheduler. The learning rate is a parameter generally accepted in the related art that is needed for learning, if the user wants to reproduce experiments with high accuracy, user should know this coefficient.

The choice of training set for the predictor was not trivial, since the pipeline inputs consist of a semantic map concatenated to a 3D noise tensor. Due to the high dimensionality of the noise space, sampling uniformly from it does not guarantee any convergence for the learning process. Instead, randomly extracted are 100 3D noise tensors and combined them with 500 semantic maps, thus obtaining 50 000 examples. Then tested is this technique by using 100, 300 and 500 noise tensors. Once trained, measured is the predictor's error by using 500 semantic maps combined with the same noises used for the training and with new noises. The results are reported, respectively, in Table 4 and Table 5.

TABLE 4

| Noises | B 1 | B 2 | B 3 | B 4 | Mean error |
|---|---|---|---|---|---|
| 100 | 5% | 6% | 6% | 7% | 6% |
| 300 | 5% | 5% | 6% | 6% | 5.5% |
| 500 | 5% | 5% | 6% | 6% | 5.5% |

Table 4 describes the validation error for the OASIS predictor. The validation set was created joining the noises (random signal) used for the training to 500 semantic maps. The first column indicates the quantity of noises used to train the predictor, while columns B1 through B4 indicate the error obtained by individual branches 1 through 4 when validated. The last column indicates the average of all errors. The table shows how the error decreases with increasing noise that we use for training.

TABLE 5

| Noises | B 1 | B2 | B3 | B 4 | Mean error |
|---|---|---|---|---|---|
| 100 | 14% | 14% | 13% | 16% | 14% |
| 300 | 10% | 11% | 11% | 15% | 12% |
| 500 | 10% | 10% | 10% | 13% | 11% |

Table S4 describes a test error for the OASIS predictor. The test set was created joining random noises to 500 semantic maps The first column indicates the quantity of noises used to train the predictor, while columns B1 through B4 indicate the error obtained by individual branches 1 through 4 when tested. The last column indicates the average of all errors. The table shows how the error decreases with increasing noise that we use for training.

In order to implement the database for guiding image generation, it is populated by 500 randomly extracted images from the train dataset.

For each one of randomly extracted images, created are 100 different inputs using a fixed set of 3D noises (noises having the structure of not a two-dimensional matrix, but a three-dimensional tensor). The inputs are fed into the first 2D convolutional layer and the subsequent ResNet module of the backbone. The obtained features were then divided into 8×16=128 non-overlapping data patches, in accordance with their resolution, which gave the keys to find the most similar image. The values were extracted by processing the inputs up to the third ResNet module of the backbone (OASIS architecture calculating module) and cutting the obtained features into the same data patches. The database is populated once at the beginning of the training phase. To decrease the redundancy in keys, applied is FPS sampling to them (since many images can be extremely similar and it makes no sense to store everything, the FPS sampling algorithm is used for this, which selects only one image from each similarity cluster), during the forward phase, after an input was processed through the first 2D convolutional layer and the subsequent ResNet layer, it was divided into 128 identical data patches (128 is arbitrary number preserving proportions. This is done in order to select more than one image that somehow looks like the original one, but to select more similar elements—a street, a corner of a house, and so on. Subsequently, the database was searched for the key most similar to each data patch with the aid of the FAISS library. All 128 retrieved values were then glued accordingly (the extracted value is rectangular patches of the plane, and the plane is always cut into 128 data patches, they are glued together by writing into a common matrix of the desired size).

Figure 2:
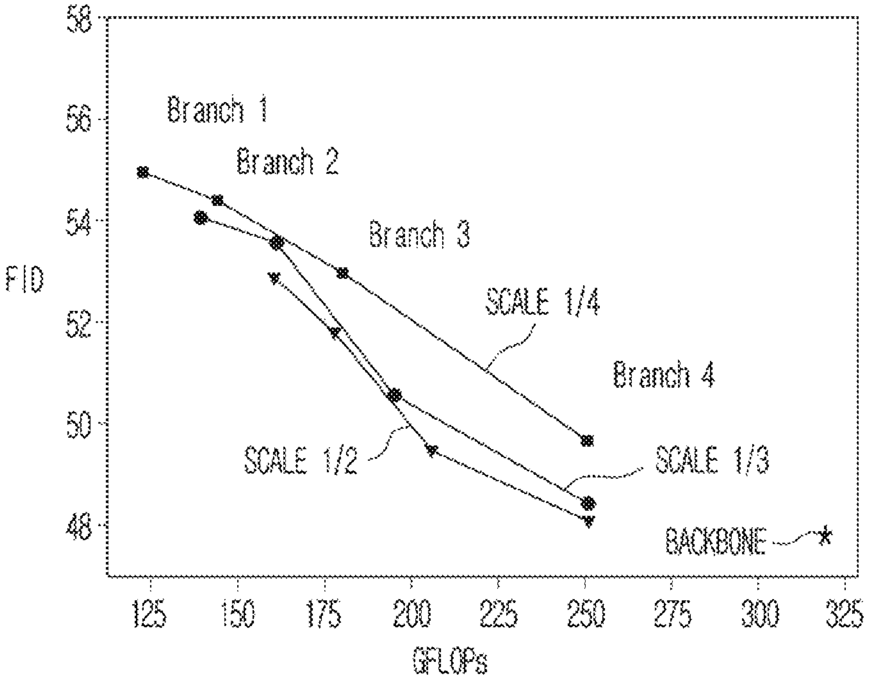
FIG. 2 illustrates relation between quality index (expressed in FID units) and computations for all branches at different scale factors of the OASIS implementation, with the use of the guiding database according to one or more embodiments.
Figure 3:
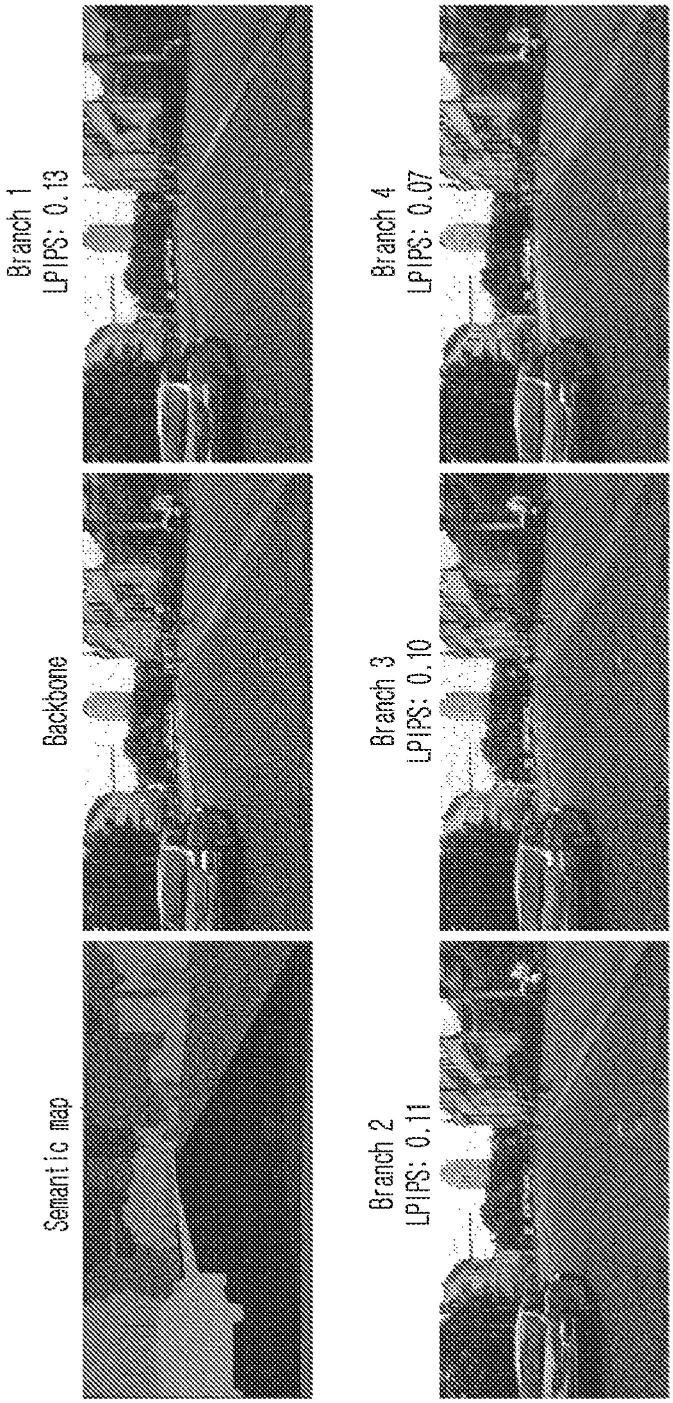
FIG. 3 illustrates examples of branches' outputs for the OASIS pipeline, according to one or more embodiments.

Used is this composed feature to guide the synthesis process by concatenating it to each branch's input after due resizing performed by a convolution. The resulting distribution of quality index among all branches, evaluated by the Fréchet inception distance (FID), is shown in FIG. 2. FIG. 2 describes relation between quality index (expressed in FID units) and computations for all branches at different scale factors of the OASIS implementation, with the use of the guiding database. The three curves on the plot connect FID values scored by exits 1 through 4 (branches 1 through 4) for different scale factors. Squares indicate scale factor ½, dots indicate scale factor ⅓, and triangles indicate scale factor ½. A higher scaling saves computations lowering quality index. The asterisk indicates the original quality index and computations for the OASIS pipeline. As mentioned above, the larger the FID, the lower the quality index of the output image, while the lower the computational cost. Finally, the pipeline comprehending all generating branches and the backbone, together with the database guidance, was used to produce the dataset for training the predictor. The OASIS input consists of a semantic map and a high-dimensional random noise space (a set of multidimensional vectors consisting of random numbers). The training is restricted to 100 fixed noise vectors in combination with the Cityscape train set. FIG. 3 illustrates examples of branches' outputs for the OASIS pipeline. Top left image represents the semantic map used as input to the pipeline, Top middle image is the output of the original OASIS model (Backbone), top right image is the output obtained by the first branch with a corresponding quality index of 0.13 LPIPS, bottom left image is the second branch's output with a corresponding quality index of 0.11 LPIPS bottom middle image is the third branch's output with a corresponding quality index of 0.10 LPIPS, bottom right image is the fourth branch's output (Early Exit) with a corresponding quality index of 0.07 LPIPS. FIG. 3 illustrates the resulting image obtained at each branch. It can be seen how the quality index deteriorates as the output order decreases, i.e. the first output has the worst quality index.

Figure 4:
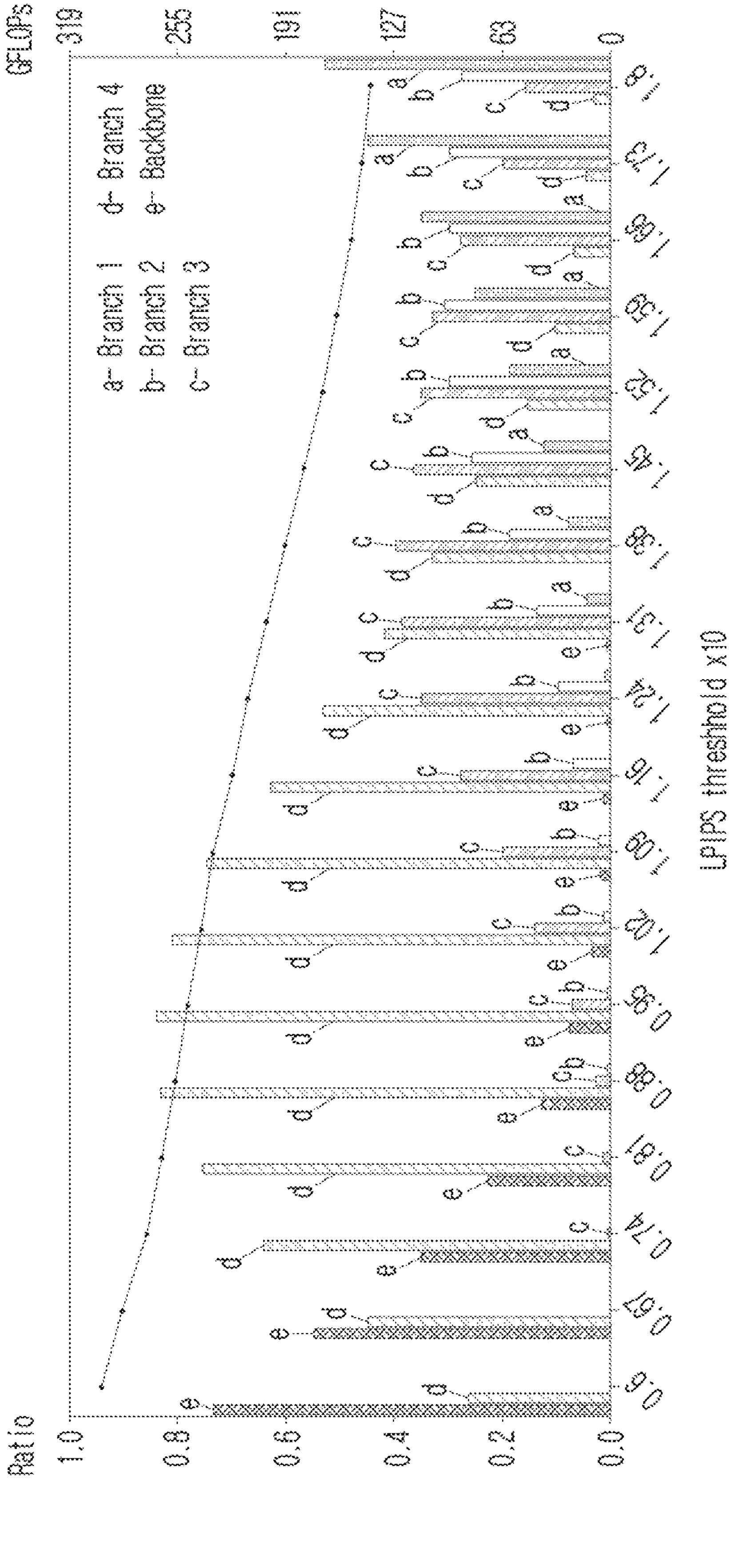
FIG. 4 illustrates distribution of computations among branches of the OASIS backbone for a range of imposed Learned Perceptual Image Patch Similarity (LPIPS) thresholds, according to one or more embodiments.

The overall result for the whole pipeline at SF=¼ is summarized by FIG. 4. FIG. 4 illustrates distribution of computations among branches of the OASIS backbone for a range of imposed LPIPS thresholds (the lower limit of quality index, measured in terms of LPIPS metric, is generally accepted in the related art). Branch 1 is "a"; Branch 2 is "b"; Branch 3 is "c"; Branch 4 is "d"; Backbone is "e". For each quality index threshold, the predictor routes the computation towards one of five possible exits based on the input's complexity it learned. As quality index requirements decrease, the use of the first branches becomes more prominent. All distributions were obtained sampling the same 500 test images and using scale factor ¼. Overall GFLOPs for each distribution are showed by the solid line, while their absolute values are shown on the right. The latter shows the distribution of branches chosen by the predictor at various quality index thresholds. One can see how different quality index thresholds affect the exit's choice: while imposing very high quality index narrows the spectrum of possible exits, at lower (but nonetheless high) requirements, all additional branches are utilized. Most importantly, the GFLOPs count shows a dramatic decrease of computations when earlier branches are used. By approximating the GFLOPs curve to a constant slope, a mean gain factor of $1.2\times10^3$ GFLOPS/LPIPS can be estimated. RATIO is the proportion of calculations compared to the number of calculations in the backbone. That is, for example, 1 corresponds to the number of calculations that matches the number of calculations in the backbone, 0.5 is half the calculations of the backbone.

The neural head avatar implementation is based on the MegaPortraits generating method for 512×512 pixels images. This pipeline consists of multiple operations ensuring the transfer of traits from a source face to a driver face, i.e. the one with the desired orientation and expression. As backbone calculating modules used is $l_i$, $i\in[1, 9]$ its final set of the calculating modules comprehending 9 residual blocks, which amount to a total of 213 GFLOPs. Attached are 3 branches, one after backbone's block number 2, 4, and 6. Their calculating modules were the same residual blocks, and their respective depth, i.e. number of the calculating modules, mirrored that of the remaining path: 8, 6 and 4, thus maintaining $k+len=9\forall k\in\{2, 4, 6\}$. To lighten the branches, three different scale factors are imposed to the calculating modules' width, i.e. number of channels. Their overall GFLOPs are listed in Table 6.

TABLE 6

| SF | 1 | 2 | 3 | BB |
|---|---|---|---|---|
| 1/1.5 | 109 | 144 | 159 | 213 |
| 1/3 | 64 | 98 | 131 | |
| 1/10 | 46 | 84 | 121 | |

Table 6 illustrate comparison between GFLOPs of all 4 computational routes through branches and the MegaPortraits backbone (BB, rightmost column). Different rows correspond to different scale factors (SF). Calculations of all outputs are illustrated in Table 6. It can be seen that the earlier the exit, the less calculations.

Branches are trained by imposing adversarial losses, as in Eq. (1), obtained competing with copies of the MegaPortraits discriminator. Alongside, imposed are VGG, MS-SSIM and $\mathcal{L}_1$ losses between the branches' and the backbones' synthetic images. Additionally, used are the backbone's intermediate logits to impose a feature matching loss (FM) and retained the original gaze loss (GL).

$$\mathcal{L}_{Branch}=\mathcal{L}_{Adv}+c_1\mathcal{L}_{VGG}+c_2\mathcal{L}_{MSSIM}+c_3\mathcal{L}_1+c_4\mathcal{L}_{FM}+c_5\mathcal{L}_{GL}, \quad (4)$$

Where $\mathcal{L}_{Adv}$ is standard adversarial loss for GANs; $\mathcal{L}_{VGG}$ is VGG loss; $\mathcal{L}_{MS\text{-}SSIM}$ is MS-SSIM loss; $\mathcal{L}_1$ is L1 loss, $\mathcal{L}_{FM}$ is Feature Matching loss; and $\mathcal{L}_{GL}$ is Gaze Loss. Coefficients $c_i$ were chosen to harmonize the losses effects.

Database is populated by images of the source face with a plethora of different orientations and expressions. At each iteration, searched is the database for the face most similar to the driver's, i.e. the one with the desired orientation and expression. To perform this search, the driver is fed to the first calculating module of MegaPortraits, which extrapolates the angles describing face direction, and a multidimensional vector which encodes face expression. Restricted are ourselves to 3 angles for the encoding of face directions, while the expression space is 512-dimensional. Once obtained is a vector characterizing the driver, the closest one from the images in the database. The retrieved image was then concatenated to the input of each branch calculating module $\tilde{I}_i$ after due resizing.

Figure 5:
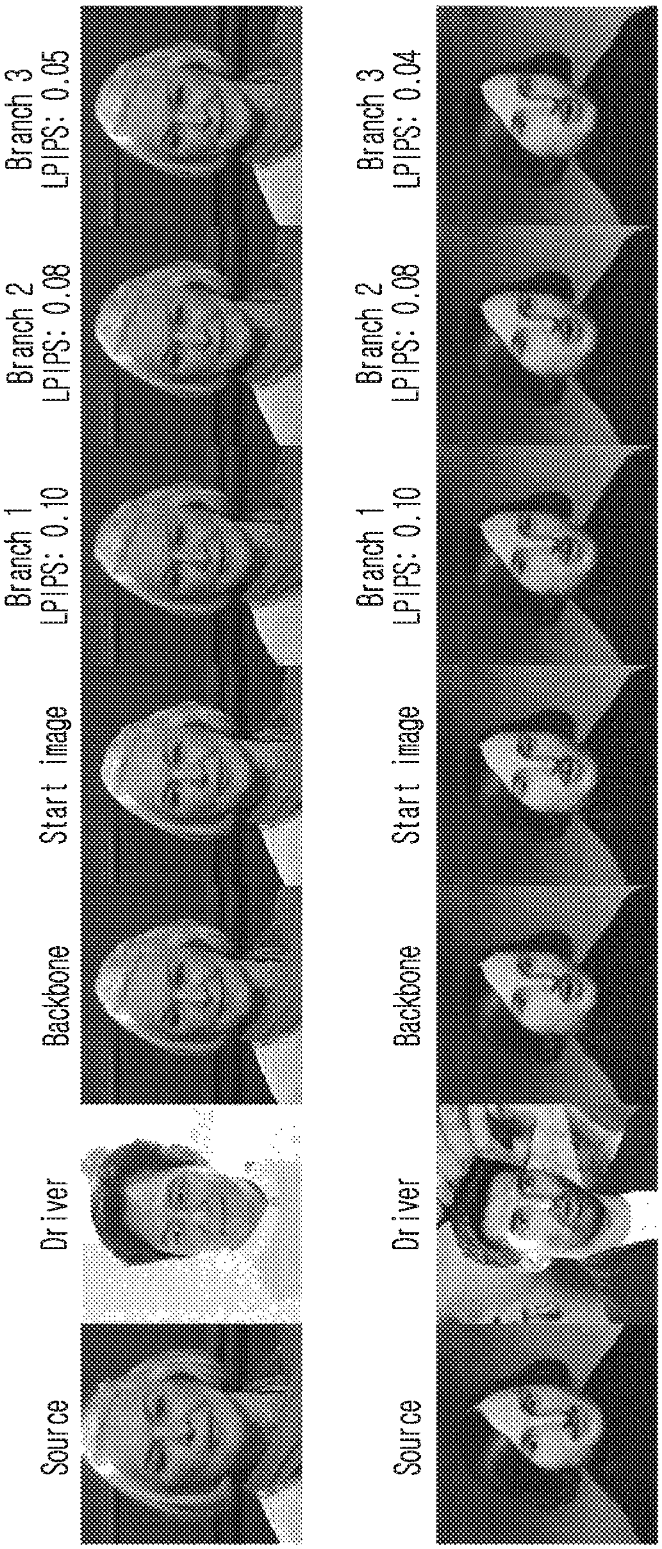
FIG. 5 illustrates examples of branches outputs for the MegaPortraits pipeline, according to one or more embodiments.

FIG. 5 illustrates examples of branches' outputs for the MegaPortraits pipeline. The top row uses as source and driver respectively the first and second image. The source's appearance is imposed on the driver's expression. The third image is the output given by the original MegaPortraits pipeline, the fourth is the image retrieved from the database. Following are outputs from branch 1 with LPIPS score 0.1, branch 2 with LPIPS 0.08, and branch 3 with LPIPS 0.05. The bottom row mirrors the top row, only changing source (image of the human on the left in FIG. 1B (*b*)) and driver images (image of the human on the right in FIG. 1B (*b*)).

Figure 6:
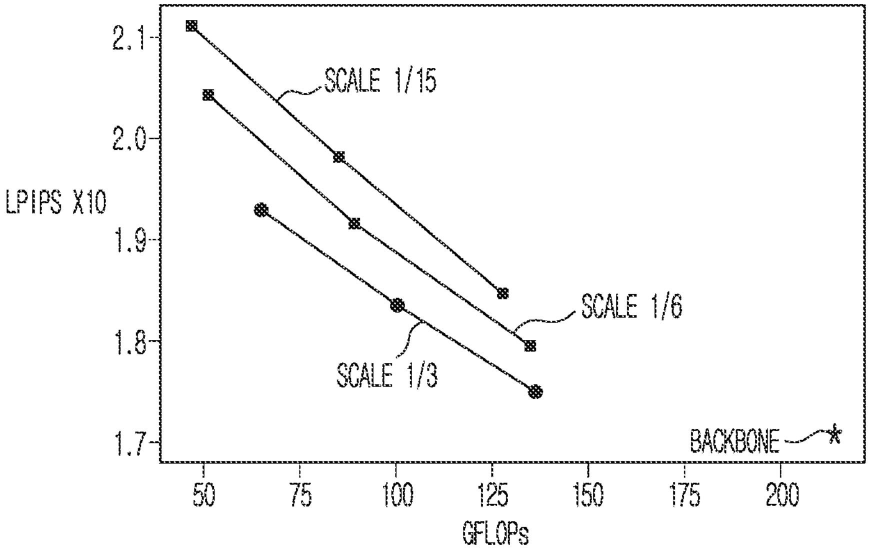
FIG. 6 illustrates relation between quality index (expressed in LPIPS units) and computations for all branches, according to one or more embodiments.

The resulting distribution of quality index among branches is shown in FIG. 6. FIG. 6 illustrates relation between quality index (expressed in LPIPS units) and computations for all branches at different scale factors of the MegaPortraits implementation, with the use of the guiding database. In FIG. 6 the three curves on the plot connect FID values scored by exits 1 through 3 (branches 1 through 3) for different scale factors. Dots indicate scale factor ⅓, squares indicate ⅙, and squares indicate 1/15. It can be seen how a higher scaling saves computations lowering quality index. The asterisk indicates the original quality index and computations for the OASIS pipeline.

Figure 7:
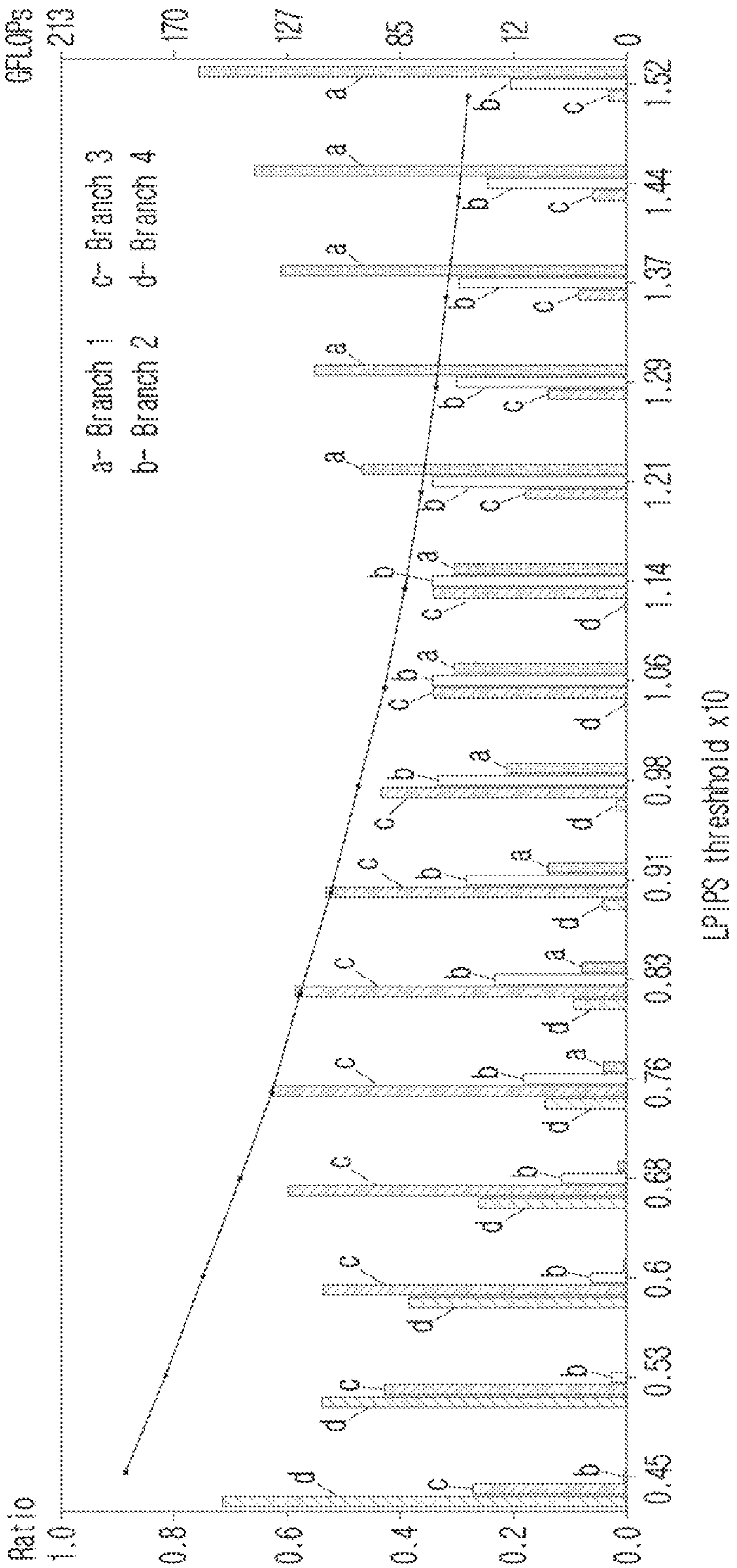
FIG. 7 illustrates distribution of computations among branches of the MegaPortraits backbone for a range of imposed LPIPS thresholds, according to one or more embodiments.

Finally, trained is the predictor. Afterwards, it was possible to impose any quality index threshold and the predictor was able to choose the path that satisfied it with the least computation. The overall results for the whole pipeline are summarized by FIG. 7. Branch 1 is "a"; Branch 2 is "b"; Branch 3 is "c"; Backbone is "d". FIG. 7 illustrates the distribution of computations among branches of the MegaPortraits backbone for a range of imposed LPIPS thresholds. For each quality index threshold, the predictor routes the computation towards one of four possible exits based on the input's complexity it learned. This is shown by the four different columns drawn for each LPIPS value. "a", "b", "c" and "d" columns correspond to the ratio of outputs routed through exits, respectively, 1,2,3, and the backbone. All distributions were obtained sampling the same 702 test images and using SF=1/15. Overall GFLOPs for each distribution are showed by the solid line, while their absolute values are shown on the right. One can see how lower quality index thresholds can be maintained with a great decrease in GFLOPs due to the use of lighter branches. By approximating the GFLOPs curve to a constant slope, it is possible estimate a mean gain factor of $1.3\times10^3$ GFLOPS/LPIPS. One can see how lower quality index thresholds can be maintained with a great decrease in GFLOPS due to the use of lighter branches. By approximating the GFLOPs curve to a constant slope, it is possible estimate a mean gain factor of $1.3\times10^3$ GFLOPs/LPIPS.

Figure 8:
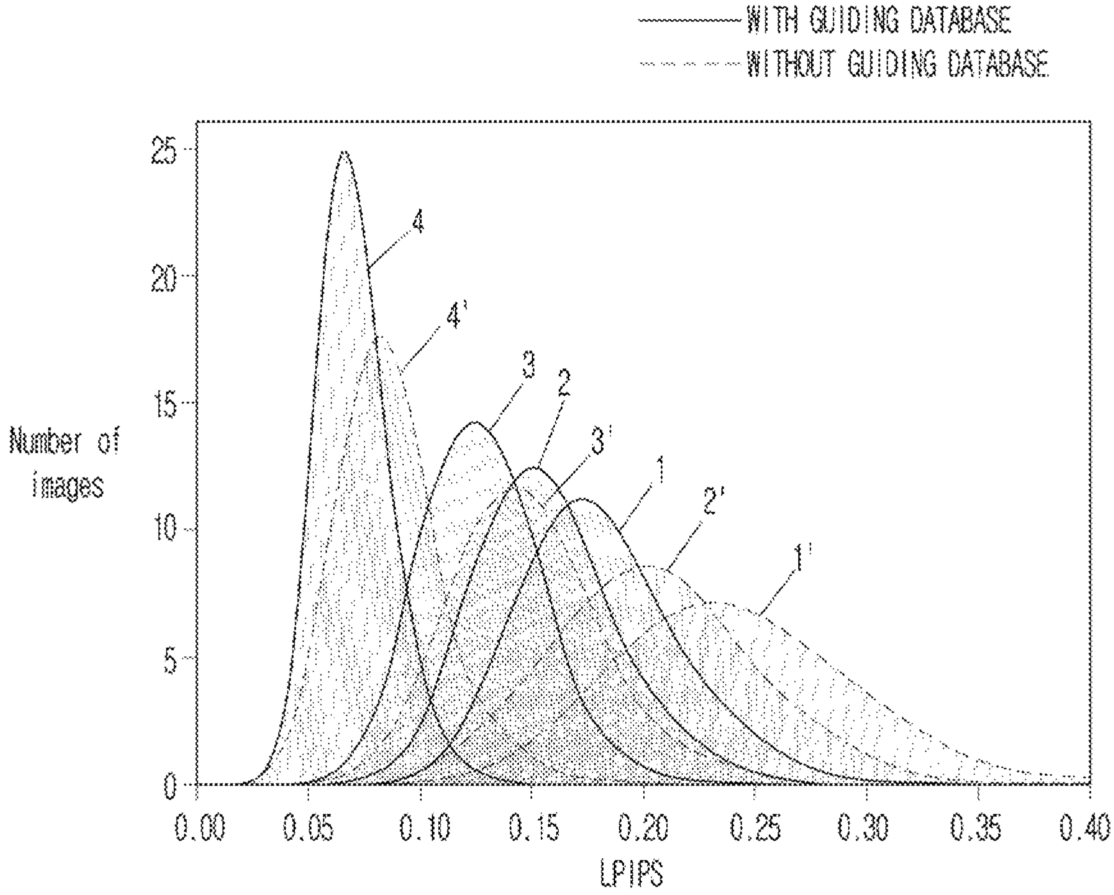
FIG. 8 illustrates OASIS pipeline, distribution of images routed to different branches in relation to their head rotation angle (in OASIS pipeline), according to one or more embodiments.

Although the image generation is possible without the database of guiding images, it is useful for ensuring the quality index of earlier branches. It can be in fact argued that its implementation harmonizes exits' output quality index, by affecting the earliest branches, as testified by FIG. 8. Number images on the y-axis indicates the number of images with LPIPS quality index on the x-axis. FIG. 8 describes comparison between quality index distributions for the OASIS pipeline with SF=¼, with the use of the guiding database and without it. LPIPS were obtained by comparison with backbones' images. Each branch's quality index distribution is numbered differently 1, 1', 2, 2', 3, 3', 4, 4'. Distributions without the database usage are shown by a dotted curve (1', 2', 3', 4'), while distributions obtained with the database usage are shown with a solid curve (1, 2, 3, 4). The more to the left of the curve, the better the output image quality index. It can be seen how quality index distributions for the first branches are shifted the most toward better qualities after the implementation of the database. For instance, the dotted curve 1' drastically shifts left, becoming the solid curve 1 with the database usage, while the dotted 4' curve shifts less, becoming the solid 4 curve. Curves were drawn sampling 500 images and applying kernel density estimation with bandwidth 0.3.

Additionally, the database can be used to amend for the deficiency of the training set. Part of the difficulty in rendering is due to a lack of the DNN training, which may very well be inherent to the specific task, as for neural head avatars generation.

As discussed, implementation of the dynamical routing relies on the creation of suitable early exit, as well as the use of a predictor. The latter is useful to enforce custom quality index thresholds, since the use of single exits is will produce only images with fixed quality index distributions.

Furthermore, although all branches have a mean quality index, captured by their FIDs (see FIG. 2 as an example), it is not possible rely on just a single branch to produce images with consistent quality index. The variation in quality index of each exit is quite wide and it gets wider in the earliest ones, as portrayed in FIG. 8. The predictor prevents this by choosing a heavier branch (more parameters) when quality index can't be provided by a lighter one.

Figure 9:
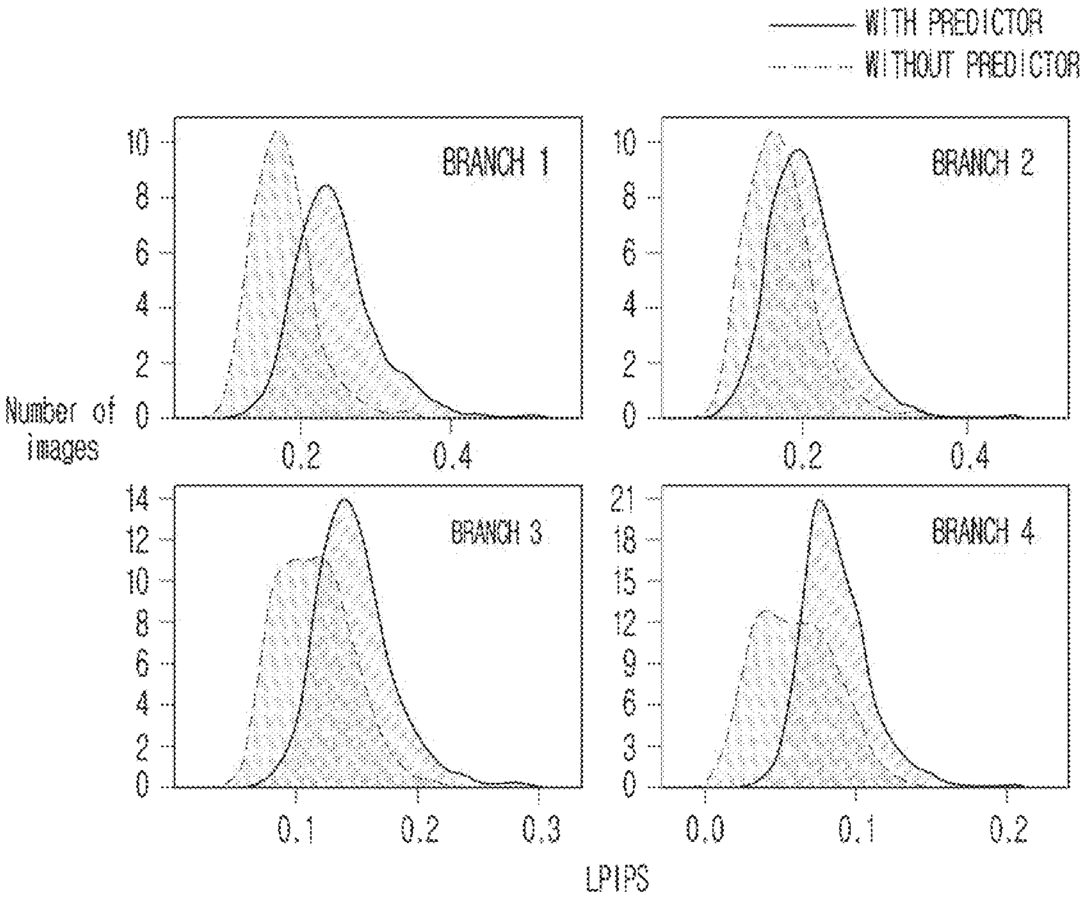
FIG. 9 illustrates comparison between the quality index distribution of single OASIS branches, and the quality index distribution obtained by use of the predictor (P), according to one or more embodiments.

The comparison between quality index distributions of images obtained from single branches and those obtained by the use of the predictor, set to output a threshold equal to the branches' mean quality index, is shown in FIG. 9 (the solid line – it is with predictor, and the dotted line – it is without predictor). Number images on the y-axis indicates the number of images with LPIPS quality index on the x-axis. It is possible to clearly see how the predictor enforces the quality index threshold by routing difficult images towards the next branches, thus shifting the distribution. FIG. 9 illustrates comparison between quality index distributions of single OASIS branches, and quality index distributions obtained by use of the predictor (P). The predictor was set to enforce thresholds equal to the branches' mean quality index. LPIPS were obtained by comparing images of branches for SF=¼ with backbones' images. Each distribution is sampled by inputting 500 semantic maps with random noises. The curves are the result of kernel density estimation with bandwidth 0.3. All four plots contain two distributions: the 1' dotted curve represents the higher quality index distribution for the method, when set to output images with lower-quality index threshold equal to the mean distributions of branch 1 through 4. The solid curve 1 in each plot represents the branch's distribution. It can be seen how the implementation of the predictor, which routes the computations in order to enforce the lower-quality index threshold, shifts distributions towards higher quality index, thus confirming his effectiveness.

Not all images are equally difficult to generate. This irregularity lays at the core of method. A multitude of reasons is responsible for such uneven difficulty distribution. Some head rotations or expressions may be less present during the training phase, and thus require a heavier model to output images with high quality index. This problem is analyzed by comparing images with different head rotations and expressions, and their quality index. Specifically, by using pipeline, generated are 702 head avatars and looked at which branch they were routed by the predictor.

Figure 10:
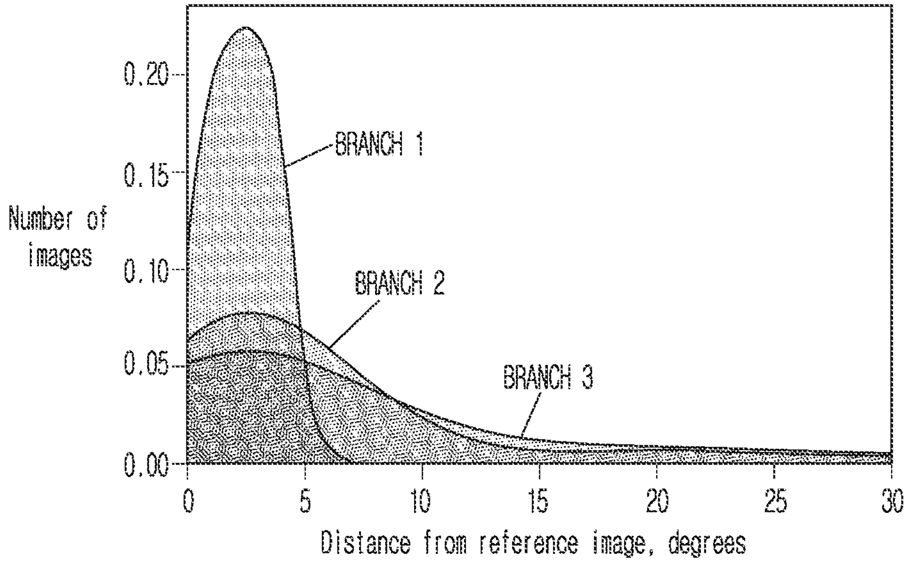
FIG. 10 illustrates comparison between quality index and computations of the OASIS pipeline, according to one or more embodiments.

FIG. 10 illustrates comparison between number of images routed to different branches in relation to their head rotation. The greater the angle between the two images the higher the difficulty gets, as reported in FIG. 10. The x-axis shows the distance, in degrees, meaning the angle between the head from the database and the head of the driver.

Used are the branches for SF=1/15. Distributions were obtained sampling 702 images in total. Curves are the result of kernel density estimation with bandwidth 0.5. The quality index threshold was set at 0.09 LPIPS. It can be seen how branch 1 is used to output most of the images in which the driver's head is only slightly turned from the start image (up to 6 degrees), while branch 2 and 3 are responsible for higher angles, thus confirming the correlation between angle and difficulty in the MegaPortraits setup. The Z-axis represents the values of the number of images normalized to 1, i.e. 1=100 images.

Although the method can save a great amount of computations, it has some limitations. The whole pipeline is applicable only to architectures which include a decoder, one cannot apply it as it is to transformers and other synthesis algorithms that don't comprehend a decoder. There is no single recipe for populating the database. Authors chose to populate it randomly, but this may actually not be the best choice. Since a training dataset is generated for the predictor, additional training inputs is needed, thus the size of viable databases is increased. All the branches need additional training, and the memory used for storing the whole pipeline is higher than the one used for the original DNN.

Saving computations is useful for the exploitation of complex algorithms, which yield state-of-the-art outputs, but are mostly implemented on "heavy machinery".

It is showed how early exits can be constructed in decoders, where internal logits need to be heavily processed before they can yield an image. Constructed is a semiparametric algorithm in order to guide the synthesis, aiding earlier exits. Then showed is how to dynamically chose the computational route using a neural network trained on examples of inputs and exits quality index. The disclosure makes a step towards this direction, namely it lowers redundant computations. Computational savings contribute to energy savings, which desirable in today's industry.

The original OASIS generative DNN consists of an initial 2D convolutional layer, followed by 6 SPADEResBlock modules and a final Conv2D, LeakyRelu, and TanH. Its total number of parameters is 74M. Appended are 4 branches to it, after ResBlock 1, 2, 3, and 4 respectively. Each branch consisted of the same number of ResBlock modules as the remaining part of the backbone. In order to create lighter computational paths, decreased is the number of channels of the branches' calculating modules. To do it in a coherent manner, all channels are scaled down uniformly by multiplying them by a scale factor (SF). Since such scaling with arbitrary coefficients may produce channel numbers too small to be of use, its effect is restrained by imposing a minimum number of channels, under which no scaling was forced. In other words, if the minimum number is 64, and the factor of ⅓ starting from 128 is enforced, the new channel number will be 64, instead of 43.

TABLE 7

| OASIS branches<br>Module | SF = 1/2<br>Branch 1 | Min. channel = 64<br>Branch 2 | <br>Branch 3 | <br>Branch 4 |
|---|---|---|---|---|
| SPADE-ResBlock | (1024, 512, 16, 32) | (1024, 256, 32, 64) | (512, 128, 64, 128) | (256, 64, 128, 256) |
| SPADE-ResBlock | (512, 236, 32, 64) | (256, 128, 64, 128) | (128, 64, 128, 256) | (64, 64, 256, 512) |
| SPADE-ResBlock | (256, 128, 64, 128) | (128, 64, 128, 256) | (64, 64, 256, 512) | |
| SPADE-ResBlock | (128, 64, 128, 256) | (64, 64, 256, 512) | | |
| SPADE-ResBlock | (64, 64, 256, 512) | | | |
| Conv2D, Tanh | (64, 3, 256, 512) | (64, 3, 256, 512) | (64, 3, 256, 512) | (64, 3, 256, 512) |
| Total number of parameters | w/o bank 45.4M | w/bank 55.7M | | |
| OASIS branches<br>Module | SF = 1/3<br>Branch 1 | Min. channel = 64<br>Branch 2 | <br>Branch 3 | <br>Branch 4 |
| SPADE-ResBlock | (1024, 336, 16, 32) | (1024, 168, 32, 64) | (512, 84, 64, 128) | (256, 64, 128, 256) |
| SPADE-ResBlock | (336, 168, 32, 64) | (168, 84, 64, 128) | (84, 64, 128, 256) | (64, 64, 256, 512) |
| SPADE-ResBlock | (168, 84, 64, 128) | (84, 64, 128, 256) | (64, 64, 256, 512) | |
| SPADE-ResBlock | (84, 64, 128, 256) | (64, 64, 256, 512) | | |
| SPADE-ResBlock | (64, 64, 256, 512) | | | |
| Conv2D, Tanh | (64, 3, 256, 512) | (64, 3, 256, 512) | (64, 3, 256, 512) | (64, 3, 256, 512) |
| Total number of parameters | w/o bank 35.6M | w/bank 44.5M | | |

TABLE 7-continued

| OASIS branches<br>Module | SF = 1/4<br>Branch 1 | Min. channel = 64<br>Branch 2 | Branch 3 | Branch 4 |
|---|---|---|---|---|
| SPADE-ResBlock | (1024, 256, 16, 32) | (1024, 128, 32, 64) | (512, 64, 64, 128) | (256, 64, 128, 256) |
| SPADE-ResBlock | (256, 128, 32, 64) | (128, 64, 64, 128) | (64, 64, 128, 256) | (64, 64, 256, 512) |
| SPADE-ResBlock | (128, 64, 64, 128) | (64, 64, 128, 256) | (64, 64, 256, 512) | |
| SPADE-ResBlock | (64, 64, 128, 256) | (64, 64, 256, 512) | | |
| SPADE-ResBlock | (64, 64, 256, 512) | | | |
| Conv2D, Tanh | (64, 3, 256, 512) | (64, 3, 256, 512) | (64, 3, 256, 512) | (64, 3, 256, 312) |
| Total number of parameters | w/o bank 30.9M | w/bank 39.1M | | |

Table 7 describes the dimensions of modules for all branches in the form of (input channels, output channels, image height, image width). The table is divided in three subtables according to the scale factor applied. The first column indicates the module's type, i.e. the transformation applied to input data; columns 2 through 5 indicate branches 1 through 4 calculating modules' dimensions. At the bottom of each suitable is the total count of parameters with and without the addition of the auxiliary database.

It can be seen from the table 7 that the more SF, that is, the greater the number of computational parameters for each Early Exit branch, the more input and output channels this Early Exit branch has, while the height and width of the output image are not changed. The larger the number of the Early Exit branch, the fewer input channels and output channels, wherein the height and width of the output image increases.

In all branches, after each SPADE-ResBlock but the last, also applied is 2D nearest-neighbor upsampling, thus doubling the height and width. When employing the database, the input channels for the first ResBlock in each branch, are multiplied by 1.5.

Figure 11:
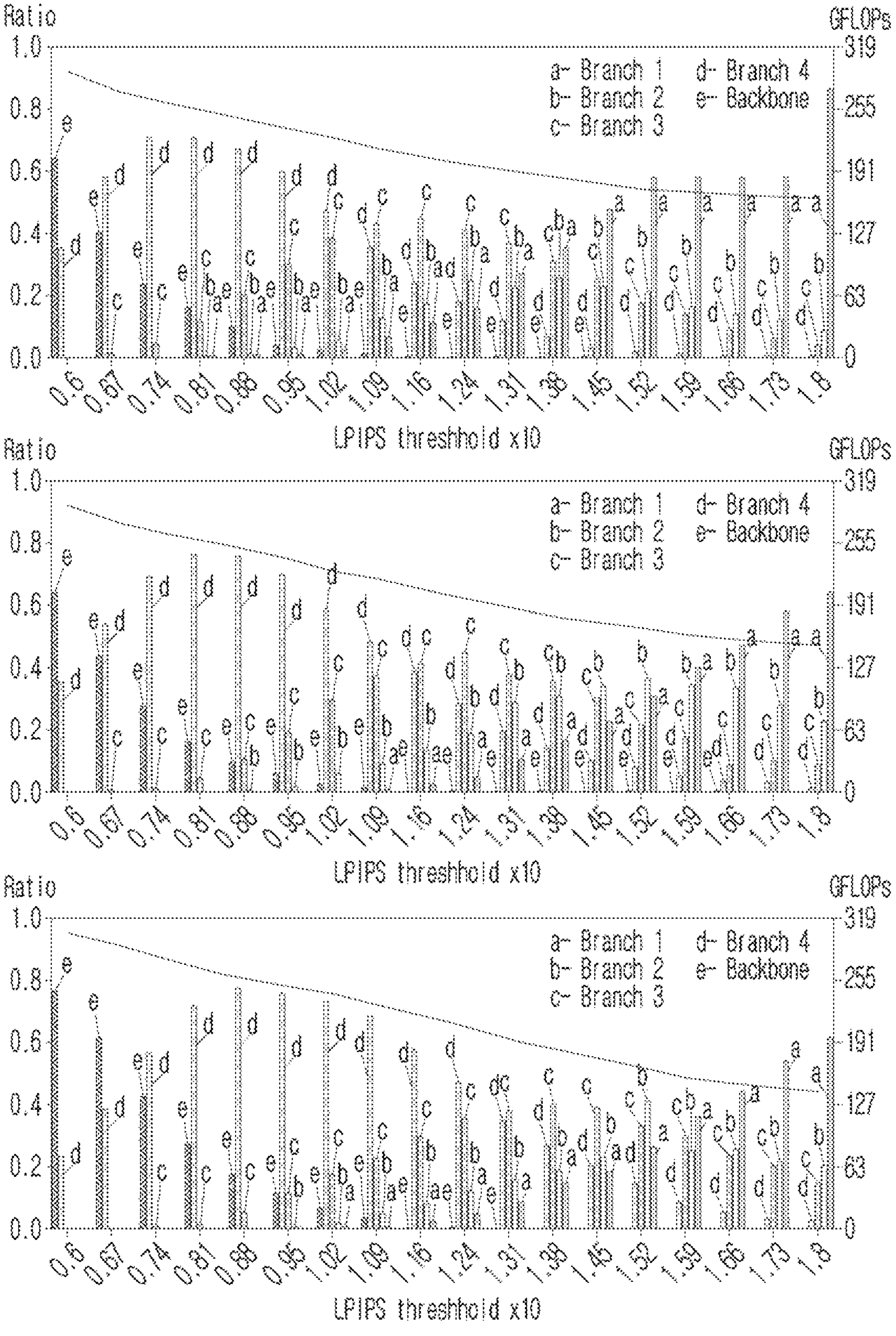
FIG. 11 illustrates, comparison between the efficacy of different scale factors (in OASIS pipeline), according to one or more embodiments.

FIG. 11 illustrates comparison between the efficacy of different scale factors. The minimum number of channels is 64. From top to bottom: SF=½, ⅓, ¼. Branch 1 is "a"; Branch 2 is "b"; Branch 3 is "c"; Branch 4 is "d"; Backbone is "e". On the X axis there are quality index thresholds values, expressed in LPIPS while on the Y axis there are the computations needed to output images expressed in GFLOPs. Plotted are columns representing how much every branch is used to output images with given quality index threshold. The sum of all columns for each threshold is equal to 1. The curve on top represents the overall GFLOPS needed to enforce the quality index threshold. This latter curve is used to estimate the model's effectiveness in term of its slope, i.e. the computational saving at the expense of quality index loss. A higher compression (SF=¼) leads to a higher gain in terms of computational savings, since its slope is higher (it almost reaches 127 Gb at its rightmost point, while other scale factors saturate earlier).

The employed database was created using 500 semantic maps randomly chosen from the training dataset, each concatenated with 100 different 3D noise tensors to produce a variety of inputs, that were processed and divided into 128 non-overlapping data patches, yielding a total of 500×100×128=6.4 Mkey-value pairs. Since redundancy in the key space is rather probable, extracted are from this multitude of pairs only up to 5K for each semantic class using.

FPS sampling, for a total of 122 100 pairs. Each key is a 1024-dimensional vector, and each value consists of a float32 tensor of dimensions (512, 4, 4). The total size of stored parameters is thus 1.1 G.

During the retrieval, the guiding features are taken after the first Conv2D and ResNet blocks of the backbone. Then, for each on the N∈[1, 35] semantic classes present in the input, these features are cut into 128 data patches and their 1024-dimensional space is scanned in order to find the closest key from the database with corresponding semantic class. This search is performed quite rapidly thanks to the FAISS library, and thus does not burden computations.

Once retrieved all 128 data patches, a guiding feature is constructed by gluing them together. This feature is concatenated to the input of each branch, and for this reason their number of channels must be increased. When employing the database, the input channels for the first ResBlocks in each branch, reported in Tab. 8, are multiplied by 1.5.

The last key component of pipeline is the Predictor. It's architecture is summarized in Table 8.

TABLE 8

| MegaPortraits Predictor | |
|---|---|
| Module | (in, out) |
| Flatten | (1584, 512) |
| Linear + LeakyReLu | |
| Linear + LeakyReLu | (512, 256) |
| Linear + LeakyReLu | (256, 128) |
| Linear + LeakyReLu | (128, 64) |
| Linear + LeakyReLu | (64, 3) |
| Total number of parameters = 1M | FLOPs = 1M |

| OASIS Predictor | |
|---|---|
| Module | (in, out) |
| Conv2D + ReLu | (1024, 512) |
| ResBlock | (512, 512) |
| Flatten | (10752, 4096) |
| Linear + ReLu | |
| Linear + ReLu | (4096, 1024) |
| Linear + ReLu | (1024, 512) |
| Linear + ReLu | (512, 128) |
| Linear | (128, 5) |
| Total number of parameters = 58M | FLOPs = 250M |

Table 8 describes architecture of the MegaPortraits and OASIS predictors. Dimensions are in the form (input channels, output channels). In both subtables, the left column indicates what kind of layers the neural network is composed of, while the right column reports its input and output dimensions. The bottom rows indicate the total number of parameters composing the networks and the number of operations needed to execute them once.

The original MegaPortraits generative DNN for images of resolution 512×512 pixels consists of a set of calculating modules predicting a volumetric representation and another set, called G2D, that renders an output image from a processed volume. Its total number of parameters is 32M. Branches are appended after ResBlock2D modules 2, 4, 6. Their respective length is 7, 5, 3. Just as before, lighter computational paths are created by scaling down all channels uniformly. The new channel numbers were obtained multiplying the original ones by a scale factor. As before, restricted is the effect of this scaling by imposing a minimum number of channels equal to 24, parameter selected without strict justification. It is not a necessary part of the method, it can be replaced by another, as further analysis shows under which no further scaling was forced. Enforced is a plethora of different scale factors, which are reported in Table 9.

TABLE 9

| MegaPortral branches Module | SF = 1/3 Branch 1 | Min. channels = 24 Branch 2 | Branch 3 |
|---|---|---|---|
| ResBlock2D | (512, 170) | (512, 170) | (512, 170) |
| ResBlock2D | (170, 170) | (170, 170) | (170, 85) |
| ResBlock2D | (170, 170) | (170, 85) | (85, 42) |
| ResBlock2D | (170, 170) | (85, 42) | |
| ResBlock2D | (170, 85) | (42, 24) | |
| ResBlock2D | (85, 42) | | |
| ResBlock2D | (42, 24) | | |
| ReLu, Conv2D, Tanh | (24, 3) | (24, 3) | (24, 3) |
| Total number of parameters | w/bank 5.6M | | |

| MegaPortral branches Module | SF = 1/6 Branch 1 | Min. channels = 24 Branch 2 | Branch 3 |
|---|---|---|---|
| ResBlock2D | (512, 85) | (512, 85) | (512, 85) |
| ResBlock2D | (85, 85) | (85, 85) | (83, 42) |
| ResBlock2D | (85, 85) | (85, 42) | (42, 24) |
| ResBlock2D | (85, 85) | (42, 24) | |
| ResBlock2D | (85, 42) | (24, 24) | |
| ResBlock2D | (42, 24) | | |
| ResBlock2D | (24, 24) | | |
| ReLu, Conv2D, Tanh | (24, 3) | (24, 3) | (24, 3) |
| Total number of parameters | w/bank 2.3M | | |

| MegaPortral branches Module | SF = 1/8 Branch 1 | Min. channels = 24 Branch 2 | Branch 3 |
|---|---|---|---|
| ResBlock2D | (512, 64) | (512, 64) | (512, 64) |
| ResBlock2D | (64, 64) | (64, 64) | (64, 32) |
| ResBlock2D | (64, 64) | (64, 32) | (32, 24) |
| ResBlock2D | (64, 64) | (32, 24) | |
| ResBlock2D | (64, 32) | (24, 24) | |
| ResBlock2D | (32, 24) | | |
| ResBlock2D | (24, 24) | | |
| ReLu, Conv2D, Tanh | (24, 3) | (24, 3) | (24, 3) |
| Total number of parameters | w/bank 1.6M | | |

| MegaPortral branches Module | SF = 1/15 Branch 1 | Min. channels = 24 Branch 2 | Branch 3 |
|---|---|---|---|
| ResBlock2D | (512, 34) | (512, 34) | (512, 34) |
| ResBlock2D | (34, 34) | (34, 34) | (34, 24) |
| ResBlock2D | (34, 34) | (34, 24) | (24, 24) |
| ResBlock2D | (34, 34) | (24, 24) | |
| ResBlock2D | (34, 24) | (24, 24) | |
| ResBlock2D | (24, 24) | | |
| ResBlock2D | (24, 24) | | |
| ReLu, Conv2D, Tanh | (24, 3) | (24, 3) | (24, 3) |
| Total number of parameters | w/bank 0.8M | | |

Table 9 describes MegaPortraits pipeline. Dimensions of the calculating modules for all branches in the form of (input channels, output channels). The table is divided in four subtables according to the scale factor applied. The first column indicates the calculating module's type, i.e. the transformation applied to input data; columns 2, 3 and 4 indicate branches 1 through 3 calculating modules' dimensions. At the bottom of each subtable is the total count of parameters comprehending the addition of the auxiliary database. The Res-Block2D are made of layers BatchNorm2D, h-swish, Conv2D, BatchNorm2D, h-swish, Conv2D, Conv2D with skipped connections. In all branches, before every ResBlock2D, applied is 2D bilinear upsampling. When employing the database, all input channel numbers must be increased by 3.

For this task, used is a database containing 960 key-value pairs. The values consisted of RGB images of the source subject, uniformly covering the space of head rotations and expressions. The keys were obtained exploiting the MegaPortraits initial calculating modules, the so-called encoders, that yield the Euler angles at which a head is rotated, as well as a multitude of parameters encoding face expressions. Each key encoded 3 angles and a 512-dimensional vector for the expressions.

The total size of stored parameters is therefore $10^9$. The database was searched for the closest key during the inference phase with the aid of the FAISS library. Each retrieved image was subsequently concatenated to the input of all ResBlock2D modules in every branch, thus when employing the database 3 channels must be added to all input channels in Table S9. The architecture of the MegaPortraits predictor is summarized in Table 10.

TABLE 10

| MegaPortraits Predictor | |
|---|---|
| Module | (in, out) |
| Flatten | (1584, 512) |
| Linear + LeakyReLu | |
| Linear + LeakyReLu | (512, 256) |
| Linear + LeakyReLu | (256, 128) |
| Linear + LeakyReLu | (128, 64) |
| Linear + LeakyReLu | (64, 3) |
| Total number of parameters = 1M | FLOPs = 1M |

| OASIS Predictor | |
|---|---|
| Module | (in, out) |
| Conv2D + ReLu | (1024, 512) |
| ResBlock | (512, 512) |
| Flaten | (10752, 4096) |
| Linear + ReLu | |
| Linear + ReLu | (4096, 1024) |
| Linear + ReLu | (1024, 512) |
| Linear + ReLu | (512, 128) |
| Linear + ReLu | (128, 5) |
| Total number of parameters = 58M | FLOPs = 250M |

Table 10 describes architecture of the MegaPortraits predictor and OASIS predictors. Dimensions are in the form (input channels, output channels). In both subtables, the left column indicates what kind of layers the neural network is composed of, while the right column reports its input and output dimensions. The bottom rows indicate the total number of parameters composing the networks and the number of operations needed to execute them once.

Training Details

For the MegaPortraits pipeline, trained are branches using hinge adversarial loss, each branch competing against a copy of multi-scale data patch discriminator. Additionally, imposed are feature matching, VGG19 perceptual, L1 and MS-SSIM losses. Also used is a specialized gaze loss computed with a VGG16 network that distills gaze detection (RT-GENE) and blink detection (RT-BENE, systems into one model. More details on the losses can be found in MegaPortraits. All losses are computed in relation to the backbone images and using only foreground regions. Overall, the total loss is $$\mathcal{L}_{Branch}=\mathcal{L}_{Adv}+c_1\mathcal{L}_{VGG}+c_2\mathcal{L}_{MS\text{-}SSIM}+c_3\mathcal{L}_{L1}+c_4\mathcal{L}_{FM}+c_5\mathcal{L}_{GL}$$

Where $\mathcal{L}_{Adv}$ is standard adversarial loss for GANs; $\mathcal{L}_{VGG}$ is VGG loss; $\mathcal{L}_{CMS\text{-}SSIM}$ is MS-SSIM loss; $\mathcal{L}_1$ is L1 loss, $\mathcal{L}_{FM}$ is Feature Matching loss; and $\mathcal{L}_{GL}$ is Gaze Loss; with the following weights: c1=18, c2=0.84, c3=0.16, $c_4$=40, and $c_5$=5. Branches and discriminators were trained using Adam W optimizers with $\beta_1$=0.05, $\beta_2$=0.999, $\epsilon=10^{-8}$, weight decay=$10^{-2}$ and initial learning rate=$2\times10^{-4}$. Cosine learning rate schedulers were employed during training with minimum learning rate of $10^{-6}$. Computations were done via PyTorch distributed data parallel. The model was trained in mixed precision on 2 P40 NVIDIA GPUs with effective batch size 6 for approximately 3 days. The resultant qualities can be found in Table 11.

TABLE 11

| Cross-reenactment | | | | |
|---|---|---|---|---|
| SP | Bank | Branch 1 FID↓ | Branch 2 FID↓ | Branch 3 FID↓ |
| 1/3 | X | 56.05 | 52.77 | 49.08 |
| | ✓ | 54.60 | 52.40 | 50.44 |
| 1/6 | X | 61.30 | 55.58 | 51.00 |
| | ✓ | 59.01 | 54.08 | 50.84 |
| 1/8 | X | 61.84 | 55.66 | 50.88 |
| | ✓ | 57.94 | 54.88 | 50.96 |
| 1/15 | X | 66.87 | 61.75 | 51.56 |
| | ✓ | 57.25 | 57.70 | 51.85 |
| | Backbone | | | 50.28 |

Table 11 describes quantitative results for the MegaPortraits pipeline, cross-reenactment. For four different scale factors SF (first column), the pipeline is tested with and without the guiding database, shown in the Bank column as a tick or a cross. Three columns, one for each branch, contain the FID (Fréchet inception distance) and mIOU (mean intersection over union) scores; at the bottom are reported these two values for the Backbone. Thus, different compressions affect the quality index, the more compressed, the lower the quality index. Also adding a bank improves the quality index, especially in the first output.

For each input, the Predictor estimates LPIPS for all branches. To train it, imposed is MAE loss between predicted and state of truth similarity, as noted above:

$$\mathcal{L}_{pred}(z,c;S)=\|P(z,c)-S\|^2. \quad (2)$$

Where c are the conditioning parameters; S is the LPIPS score for an image generated with aforementioned parameters; and P(c) is the predictor's output.

Employed is the AdamW optimizer with $\beta_1$=0.05, $\beta_2$=0.999 and initial learning rate $2\times10^{-4}$ alongside cosine learning rate scheduler.

Figure 12:
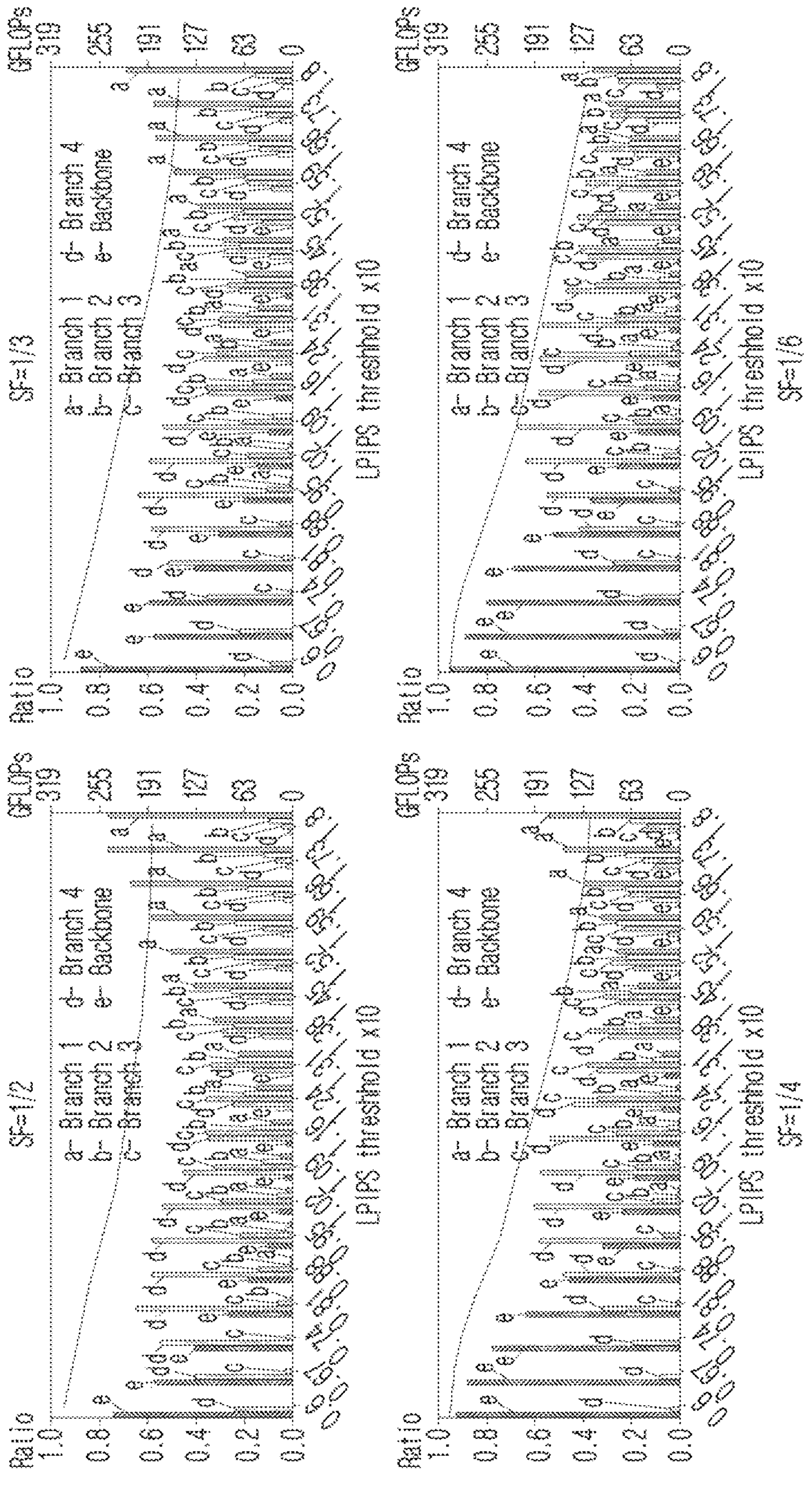
FIG. 12 illustrates comparison between the efficacy of different scale factors (in OASIS pipeline), according to one or more embodiments.
Figure 13:
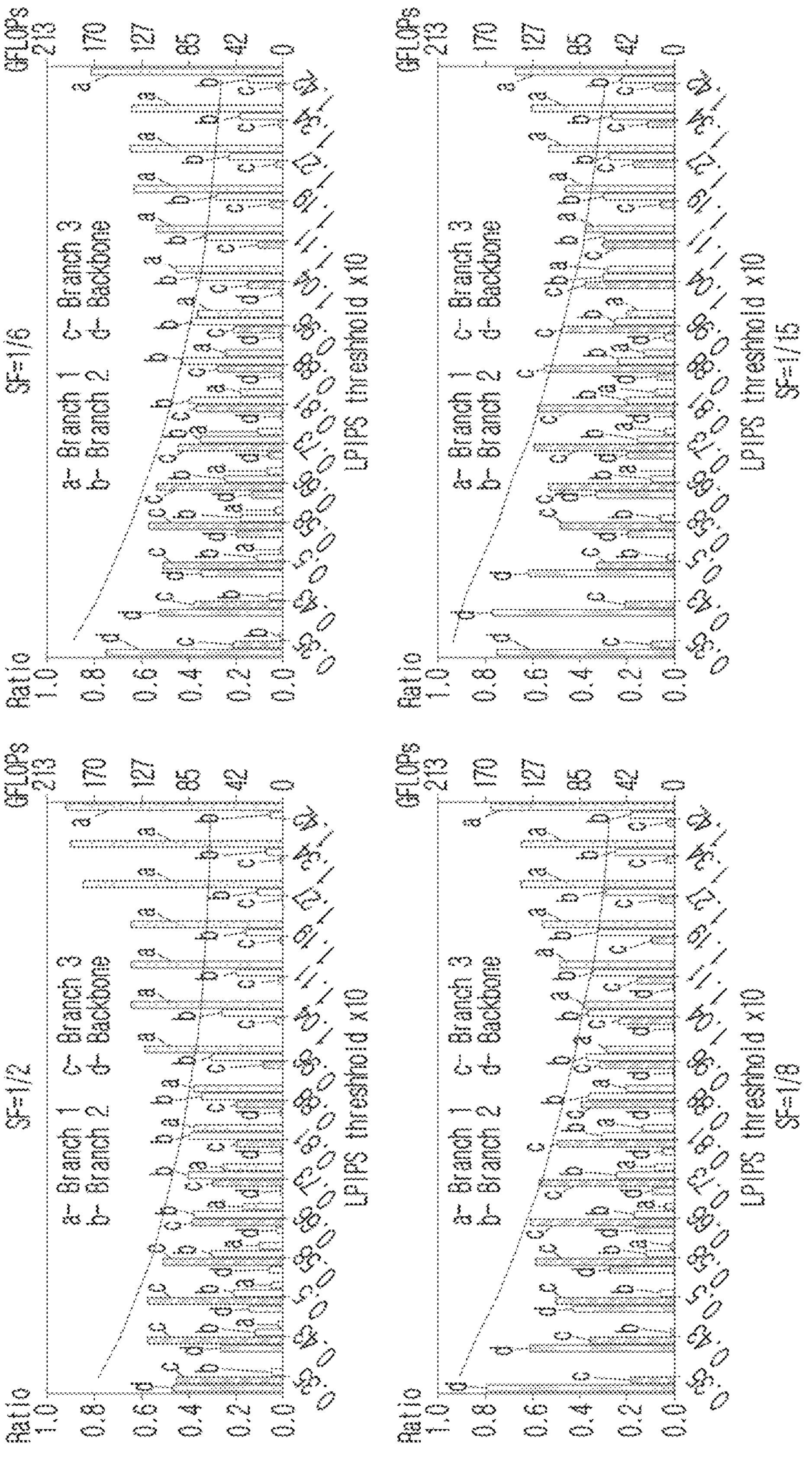
FIG. 13 illustrates comparison between the efficacy of different scale factors (in MegaPortraits pipeline), according to one or more embodiments.

Implemented are all architectures listed in Table 7 and Table 9. The overall results for the OASIS pipeline can be compared in FIG. 11 and FIG. 12, while for the MegaPortraits pipeline they are shown in FIG. 13. FIG. 12 illustrates OASIS pipeline. The minimum number of channels is 32. Branch 1 is "a"; Branch 2 is "b"; Branch 3 is "c"; Branch 4 is "d"; Backbone is "e". Comparison between the efficacy of different scale factors. Top to bottom, left to right: SF=½, ⅓, ¼, ⅙. FIG. 13 illustrates MegaPortraits pipeline, comparison between the efficacy of different scale factors. From left to right: SF=⅓, ⅙, ⅛, 1/15. It is possible to see how different scale factors yield different branch distributions. For all of these plots, On the X axis there are thresholds values, expressed in LPIPS while on the Y axis there are the computations needed to output images expressed in GFLOPs. Plotted are columns representing how much every branch is used to output images with a given quality index threshold. The sum of all columns for each threshold is equal to 1. The curve on top represents the overall GFLOPs needed to enforce said quality index threshold. This latter curve is used to estimate our model's effectiveness in term of its slope, i.e. the computational saving at the expense of quality index loss. A higher compression leads to a higher gain in terms of computational savings.

Figure 14:
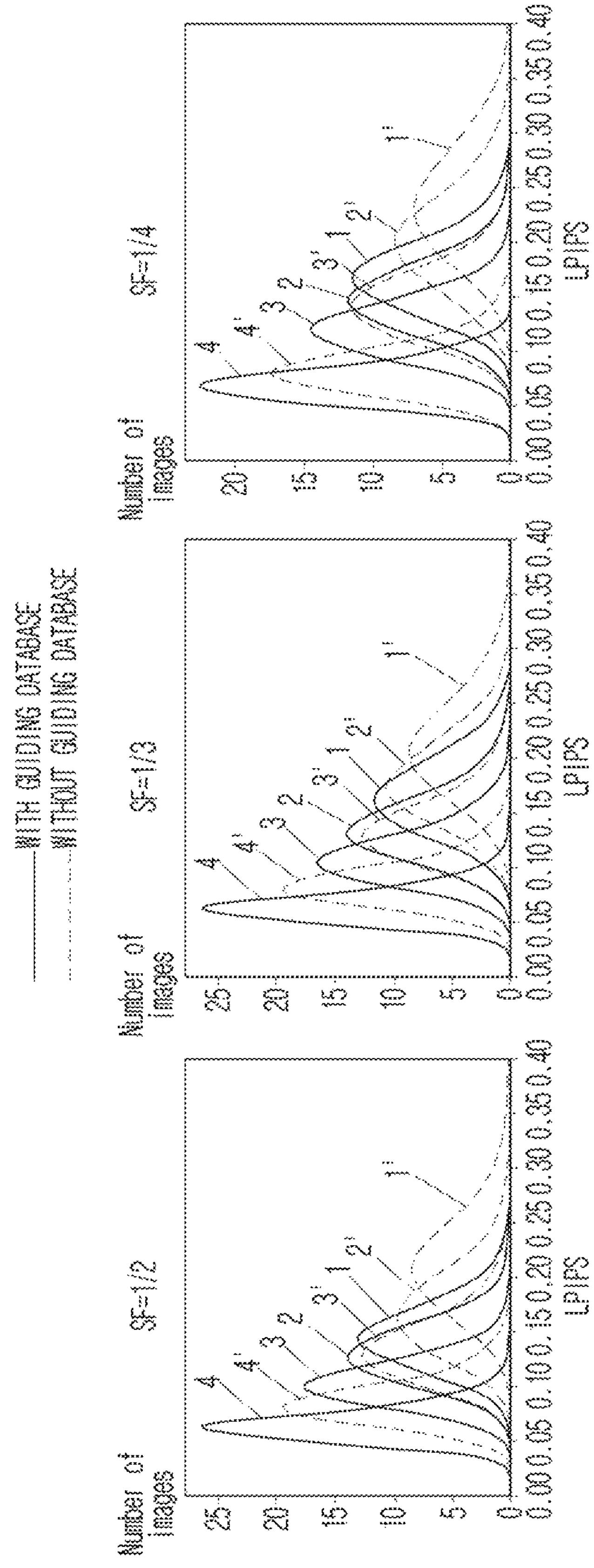
FIG. 14 illustrates comparison between the database effect to quality index distribution for different scale factors (in OASIS pipeline), according to one or more embodiments.

The effect of the database on the branches of all scale factors is reported in FIG. 14. FIG. 14 illustrates OASIS pipeline, comparison between the database effect to quality index distribution for different scale factors. Each branch's quality index distribution is numbered differently 1, 1', 2, 2', 3, 3', 4, 4'. Distributions without the database usage are shown by a dotted curve (1', 2', 3', 4'), while distributions obtained with the database usage are shown with a solid curve (1, 2, 3, 4). The minimum number of channels is 64. Left to right: SF=½, ⅓, ¼. On the X axis quality index is shown in LPIPS units, while Y shows the number of images outputted with said quality index. Different branches output quality index distributions plotted with different colors. Quality index distributions obtained without the database implementation are shown by a dotted curve, while quality index with database usage is plotted with a solid line. It is possible to clearly see how the first branches are affected the most by the database implementation, since quality index distribution for these first branches are shifted the most towards better values. Therefore, the database is a valid instrument for harmonizing output quality index.

Figure 15:
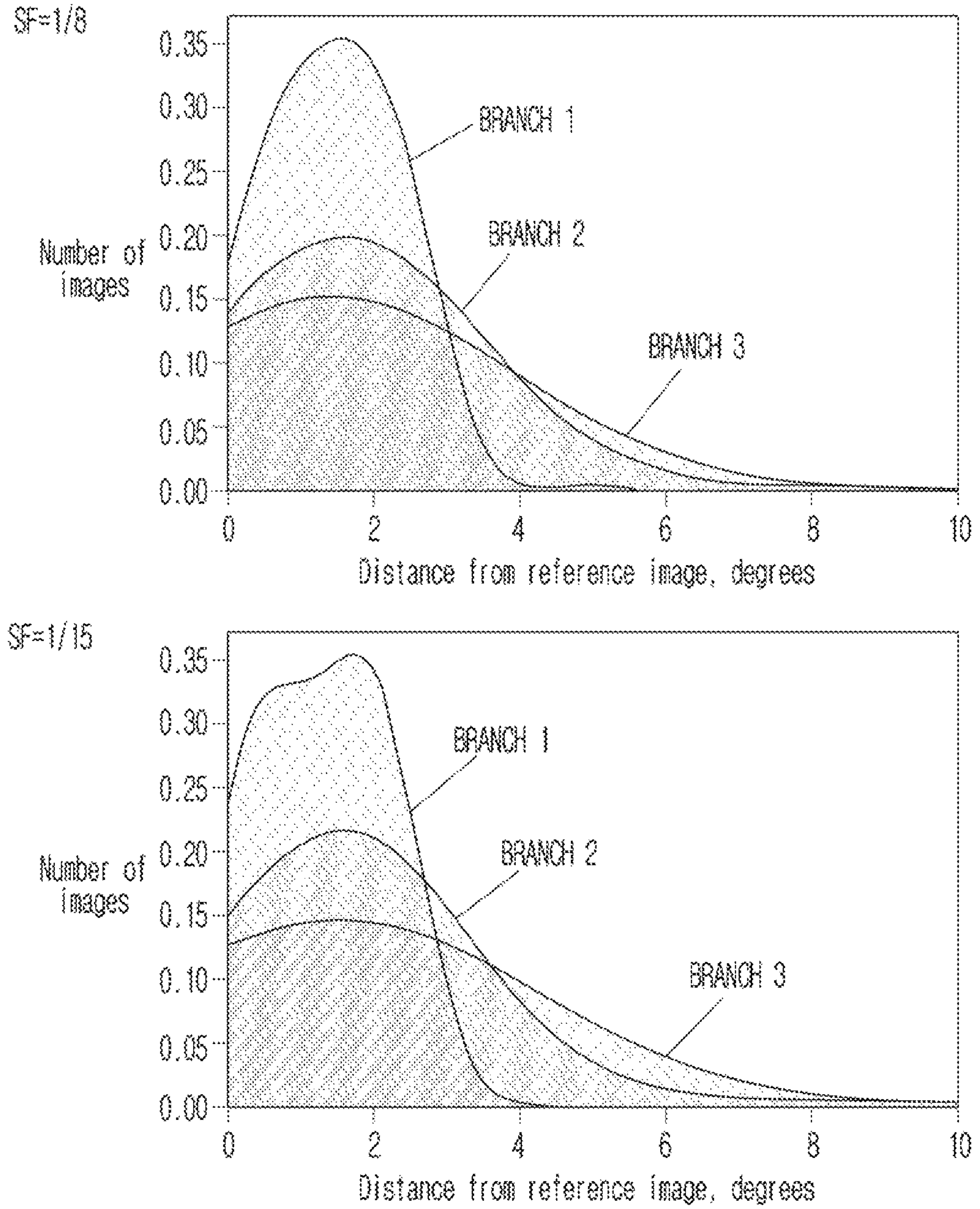
FIG. 15 illustrates distribution of images routed to different branches in relation to their head rotation angle (in MegaPortraits pipeline), according to one or more embodiments.

For the MegaPortraits pipeline, the quality index of synthesized images seems to correlate with the angle at which the head is rotated. This is reflected in the method as well. Indeed, heads rotated at higher angles have greater probability of being routed to a later branch, as evidenced by FIG. 15. FIG. 15 illustrates MegaPortraits pipeline, distribution of images routed to different branches in relation to their head rotation angle. First row SF=⅛, second row SF=1/15. On the X axis, the angle between the reference's head and the outputs' head is reported, while on the Y axes the number of images outputted with said angle is reported. It can be clearly see how for small angles, most of images are outputted by the first branch, while wider angles are processed by the second and third branches to yield an output. It is possible to conclude that the one of the sources of the rendering complexity is the head's rotation, and thus not all positions require as much computations as small angles, which confirms the need for our branches' and predictors' implementation.

While the disclosure has been particularly shown and described with reference to embodiments thereof, it will be understood that various changes in form and details may be made therein without departing from the spirit and scope of the following claims.

What is claimed is:

1. A system for obtaining output images having a quality index selectable by a user, the system comprising:

an electronic device comprising at least one processor and a memory operably connected to the processor and storing input images, a plurality of generative artificial neural networks (GANs) and a plurality of predictors, the at least one processor being configured to implement the GANs and the predictors to perform artificial neural network operations;

wherein each GAN being selectable by the user from the plurality of GANs stored in the memory, for obtaining an image with a predefined quality index, each GAN is pre-trained, and each GAN comprises:

a plurality of calculating modules forming a backbone, and a plurality of earlier exit branches each of which is connected after each calculating module, except for a last calculating module of the backbone, each earlier exit branch containing as many calculating modules as remain in the backbone from a connection point of that earlier exit branch to a backbone exit, each calculating module of each earlier exit branch performing a same function as a corresponding remaining calculating module in the backbone, and a computational budget of each earlier exit branch being less than a computational budget of corresponding remaining calculating modules of the backbone to the backbone exit, and wherein each of the plurality of predictors is an artificial neural network, each predictor is generated and pre-trained for one of the plurality of GANs stored in the memory, and each predictor is configured to predict a quality index of a processed image for output of each earlier exit branch of the particular GAN based on an input image, which the user intends to apply to an input of the particular GAN, wherein the closer a particular earlier exit branch is located to the backbone exit, the higher a computational budget for obtaining a particular output image generated by the particular earlier exit branch, wherein quality indexes of output images generated by different earlier exit branches are different from each other, and wherein each GAN is configured to output the output images from one of the plurality of earlier exit branches, which generates the output image having the quality index most matching the quality index selected by the user.

2. The system of claim 1, wherein the electronic device further comprises a display configured to display the output image.

3. The system of claim 1, wherein quality indexes of the output images generated by the plurality of earlier exit branches increase as proximity to the backbone exit increases.

4. The system of claim 1, further comprising a database storing guide data, wherein each GAN is further configured to fetch, from the database, guide data corresponding to the input image and to concatenate with input image data inputted to the GAN, wherein the guide data are concatenated with data from one of the plurality of calculating modules before the earlier exit branch, and obtained after concatenating data are fed into the earlier exit branch for further processing.

5. The system of claim 4, wherein the guide data are image patches.

6. The system of claim 4, wherein the guide data are features.

7. The system of claim 4, wherein the guide data are feature patches.

8. The system of claim 1, wherein the quality index is expressed in Fréchet inception distance (FID) units.

9. A method for obtaining an output image with a quality index selected by a user, the method comprising:

selecting, from a memory by the user, an input image, a pre-trained generative artificial neural network (GAN), and pre-trained predictor corresponding to the pre-trained GAN, the pre-trained GAN comprising a plurality of calculating modules forming a backbone, a plurality of earlier exit branches each of which is connected after each calculating module, except for a last calculating module of the backbone, each earlier exit branch containing as many calculating modules as remain in the backbone from a connection point of that earlier exit branch to a backbone exit, each calculating module of each earlier exit branch performing a same function as a corresponding remaining calculating module in the backbone, and a computational budget of each earlier exit branch being less than a computational budget of corresponding remaining calculating modules of the backbone to the backbone exit;

selecting, by the user, the quality index for the output image;

feeding the input image converted to predictor input data to be processed by the pre-trained predictor, to the pre-trained predictor;

predicting based on the input data, by the pre-trained predictor, predicted quality indexes for potential output images, which would be generated by each of the plurality of earlier exit branches of the pre-trained GAN;

selecting one earlier exit branch whose output image has a potential quality index most matching the quality index selected by the user;

converting the input image into GAN input data to be processed by the pre-trained GAN;

feeding the GAN input data to the pre-trained GAN with the one earlier exit branch for processing;

processing the GAN input data by the pre-trained GAN with the one earlier exit branch; and obtaining, on exit of the one earlier exit branch, the output image.

10. The method of claim 9, further comprising storing in the memory the output image.

11. The method of claim 9, further comprising displaying, on a display of an electronic device, the output image.

12. The method of claim 9, wherein quality indexes of output images generated by the plurality of earlier exit branches increase as proximity to the backbone exit increases.

13. The method of claim 9, wherein the quality index is expressed in Fréchet inception distance (FID) units.

14. A method for obtaining an output image with a quality index selected by a user, the method comprising:

selecting, from a memory by the user, an input image, a pre-trained generative artificial neural network (GAN), and pre-trained predictor corresponding to the pre-trained GAN, the pre-trained GAN comprising a plurality of calculating modules forming a backbone, a plurality of earlier exit branches each of which is connected after each calculating module, except for a last calculating module of the backbone, each earlier exit branch containing as many calculating modules as remain in the backbone from a connection point of that earlier exit branch to a backbone exit, each calculating module of each earlier exit branch performing a same function as a corresponding remaining calculating module in the backbone, and a computational budget of each earlier exit branch being less than a computational budget of corresponding remaining calculating modules of the backbone to the backbone exit;

selecting, by the user, the quality index for the output image;

feeding the input image converted to predictor input data to be processed by the predictor, to the pre-trained predictor;

predicting based on the input image, by the pre-trained predictor, predicted quality indexes for potential output images, which would be generated by each of the plurality of earlier exit branches of the pre-trained GAN;

selecting one earlier exit branch whose output image has a potential quality index most matching the quality index selected by the user;

converting the input image into GAN input data to be processed by the pre-trained GAN;

feeding the GAN input data to the pre-trained GAN with the one earlier exit branch for processing;

processing the GAN input data by the pre-trained GAN with the one earlier exit branch, and during the processing:

fetching, from a database storing guide data, fetched guide data corresponding to the input image, concatenating the fetched guide data with data output from one of the calculating modules preceding the one earlier exit branch to generate concatenated data, and feeding the concatenated data into the one earlier exit branch or into the backbone for further processing; and obtaining, on exit of the one earlier exit branch, the output image.

15. The method of claim 14, further comprising displaying, on a display of an electronic device, the output image.

16. The method of claim 14, wherein quality indexes of output images generated by the plurality of earlier exit branches increase as proximity to the backbone exit increases.

17. The method of claim 14, wherein the quality index is expressed in Fréchet inception distance (FID) units.

18. The method of claim 14, wherein the guide data are image patches.

19. The method of claim 14, wherein the guide data are features.

20. The method of claim 14, wherein the guide data are feature patches.

* * * * *